United States Patent
Harada et al.

(10) Patent No.: US 7,813,565 B2
(45) Date of Patent: Oct. 12, 2010

(54) IMAGE PROCESSING APPARATUS, IMAGE FORMING APPARATUS, AND IMAGE PROCESSING METHOD

(75) Inventors: Kohsuke Harada, Nara (JP); Tokiyuki Okano, Yamatokoriyama (JP); Makoto Higuchi, Yamatokoriyama (JP); Sohichi Takata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 865 days.

(21) Appl. No.: 11/729,779

(22) Filed: Mar. 30, 2007

(65) Prior Publication Data

US 2007/0237405 A1 Oct. 11, 2007

(30) Foreign Application Priority Data

Apr. 5, 2006 (JP) .............................. 2006-104605
Apr. 13, 2006 (JP) .............................. 2006-111169

(51) Int. Cl.
*G06K 9/36* (2006.01)
*G06K 9/00* (2006.01)
*G06K 9/46* (2006.01)

(52) U.S. Cl. .................. 382/232; 382/173; 382/190

(58) Field of Classification Search ................ 382/164, 382/166, 173, 190, 232, 243, 305; 375/240.18, 375/240.24, 240.26, E7.13, E7.145, E7.185; 345/60–63, 67, 419, 690; 348/231.2, 231.9, 348/390.1, 797; 358/434, 453, 538
See application file for complete search history.

(56) References Cited

U.S. PATENT DOCUMENTS

| 5,371,610 | A | * | 12/1994 | Sugawa ...................... 358/434 |
| 5,550,640 | A | * | 8/1996 | Tsuboi et al. ................. 386/35 |
| 5,699,117 | A | * | 12/1997 | Uramoto et al. .......... 348/390.1 |
| 5,801,776 | A | * | 9/1998 | Tamura et al. .......... 375/240.18 |
| 5,959,672 | A | * | 9/1999 | Sasaki ................... 375/240.23 |
| 6,404,919 | B1 | * | 6/2002 | Nishigaki et al. ............ 382/176 |
| 6,661,452 | B1 | | 12/2003 | Nishikawa |
| 7,295,712 | B2 | * | 11/2007 | Hattori ....................... 382/232 |
| 7,436,440 | B2 | * | 10/2008 | Tagawa .................... 348/231.2 |
| 2007/0237405 | A1 | * | 10/2007 | Harada et al. ................ 382/232 |
| 2007/0245395 | A1 | * | 10/2007 | Masuda ....................... 725/131 |
| 2008/0263012 | A1 | * | 10/2008 | Jones ............................ 707/3 |

FOREIGN PATENT DOCUMENTS

| JP | 5-109199 A | 4/1993 |
| JP | 11-187261 A | 7/1999 |
| JP | 11-239321 A | 8/1999 |
| JP | 2002-29101 A | 1/2002 |

* cited by examiner

*Primary Examiner*—Amir Alavi
(74) *Attorney, Agent, or Firm*—Birch, Stewart, Kolasch & Birch LLP

(57) ABSTRACT

A storage area where compressed data is stored is divided into a plurality of divided areas having a data length of Ls. Each divided area is divided into two areas, a first area having a data length of Ld and a second area having a data length of La. A plurality of first areas are gathered starting from the upper address to the lower address, whereby a memory area for compressed image data is composed. A plurality of second areas are gathered starting from the upper address to the lower address, whereby a memory area for compressed attribute data is composed. Compressed image data is sequentially written starting from the upper address to the lower address of the memory area for compressed image data. Compressed attribute data is sequentially written starting from the upper address to the lower address of the memory area for compressed attribute data.

16 Claims, 15 Drawing Sheets

FIG. 6

| IMAGE DATA ||
|---|---|
| COMPRESSION RATIO | DATA SIZE AFTER COMPRESSION (MB) |
| 100% | 99.58 |
| 95% | 94.60 |
| 90% | 89.62 |
| 85% | 84.64 |
| 80% | 79.67 |
| 75% | 74.69 |
| 70% | 69.71 |
| 65% | 64.73 |
| 60% | 59.75 |
| 55% | 54.77 |
| 50% | 49.79 |
| 45% | 44.81 |
| 40% | 39.83 |
| 35% | 34.85 |
| 30% | 29.87 |
| 25% | 24.90 |
| 20% | 19.92 |
| 15% | 14.94 |
| 10% | 9.96 |
| 5% | 4.98 |
| 1% | 1.00 |

FIG. 7

| ATTRIBUTE DATA | |
|---|---|
| COMPRESSION RATIO | DATA SIZE AFTER COMPRESSION (MB) |
| 100% | 33.19 |
| 95% | 31.53 |
| 90% | 29.87 |
| 85% | 28.21 |
| 80% | 26.56 |
| 75% | 24.90 |
| 70% | 23.24 |
| 65% | 21.58 |
| 60% | 19.92 |
| 55% | 18.26 |
| 50% | 16.60 |
| 45% | 14.94 |
| 40% | 13.28 |
| 35% | 11.62 |
| 30% | 9.96 |
| 25% | 8.30 |
| 20% | 6.64 |
| 15% | 4.98 |
| 10% | 3.32 |
| 5% | 1.66 |
| 1% | 0.33 |

FIG. 8

| | IMAGE DATA | | | ATTRIBUTE DATA | |
|---|---|---|---|---|---|
| COMPRESSION RATIO | DATA SIZE AFTER COMPRESSION(MB) | CONTIGUOUS DATA LENGTH Ld(Byte) | COMPRESSION RATIO | DATA SIZE AFTER COMPRESSION(MB) | CONTIGUOUS DATA LENGTH La(Byte) |
| 10% | 9.96 | 12629 | 20% | 6.64 | 8419 |
| 10% | 9.96 | 12887 | 19% | 6.31 | 8161 |
| 10% | 9.96 | 13155 | 18% | 5.97 | 7893 |
| 10% | 9.96 | 13435 | 17% | 5.64 | 7613 |
| 10% | 9.96 | 13727 | 16% | 5.31 | 7321 |
| 10% | 9.96 | 14032 | 15% | 4.98 | 7016 |
| 10% | 9.96 | 14351 | 14% | 4.65 | 6697 |
| 10% | 9.96 | 14685 | 13% | 4.32 | 6363 |
| 10% | 9.96 | 15035 | 12% | 3.98 | 6013 |
| 10% | 9.96 | 15401 | 11% | 3.65 | 5647 |
| 10% | 9.96 | 15786 | 10% | 3.32 | 5262 |
| 10% | 9.96 | 16191 | 9% | 2.99 | 4857 |
| 10% | 9.96 | 16617 | 8% | 2.66 | 4431 |
| 10% | 9.96 | 17066 | 7% | 2.32 | 3982 |
| 10% | 9.96 | 17540 | 6% | 1.99 | 3508 |
| 10% | 9.96 | 18042 | 5% | 1.66 | 3006 |
| 10% | 9.96 | 18572 | 4% | 1.33 | 2476 |
| 10% | 9.96 | 19135 | 3% | 1.00 | 1913 |
| 10% | 9.96 | 19733 | 2% | 0.66 | 1315 |
| 10% | 9.96 | 20370 | 1% | 0.33 | 678 |

Ls=21048(Byte)
Ls=Ld+La

FIG. 9

| IMAGE DATA | | | ATTRIBUTE DATA | |
|---|---|---|---|---|
| COMPRESSION RATIO | DATA SIZE AFTER COMPRESSION (MB) | CONTIGUOUS DATA LENGTH Ld (Byte) | COMPRESSION RATIO | DATA SIZE AFTER COMPRESSION (MB) | CONTIGUOUS DATA LENGTH La (Byte) |
|---|---|---|---|---|---|
| 20% | 19.92 | 15786 | 20% | 6.64 | 5262 |
| 19% | 18.92 | 15581 | 20% | 6.64 | 5467 |
| 18% | 17.92 | 15360 | 20% | 6.64 | 5688 |
| 17% | 16.93 | 15119 | 20% | 6.64 | 5929 |
| 16% | 15.93 | 14858 | 20% | 6.64 | 6190 |
| 15% | 14.94 | 14572 | 20% | 6.64 | 6476 |
| 14% | 13.94 | 14259 | 20% | 6.64 | 6789 |
| 13% | 12.95 | 13914 | 20% | 6.64 | 7134 |
| 12% | 11.95 | 13531 | 20% | 6.64 | 7517 |
| 11% | 10.95 | 13106 | 20% | 6.64 | 7942 |
| 10% | 9.96 | 12629 | 20% | 6.64 | 8419 |
| 9% | 8.96 | 12092 | 20% | 6.64 | 8956 |
| 8% | 7.97 | 11481 | 20% | 6.64 | 9567 |
| 7% | 6.97 | 10781 | 20% | 6.64 | 10267 |
| 6% | 5.97 | 9971 | 20% | 6.64 | 11077 |
| 5% | 4.98 | 9021 | 20% | 6.64 | 12027 |
| 4% | 3.98 | 7893 | 20% | 6.64 | 13155 |
| 3% | 2.99 | 6533 | 20% | 6.64 | 14515 |
| 2% | 1.99 | 4858 | 20% | 6.64 | 16190 |
| 1% | 1.00 | 2746 | 20% | 6.64 | 18302 |

Ls=21048 (Byte)
Ls=Ld+La

IMAGE PROCESSING APPARATUS, IMAGE FORMING APPARATUS, AND IMAGE PROCESSING METHOD

CROSS-REFERENCE TO RELATED APPLICATIONS

This Nonprovisional application claims priority under 35 U.S.C. §119(a) on Patent Applications No. 2006-104605 filed in Japan on Apr. 5, 2006 and No. 2006-111169 filed in Japan on Apr. 13, 2006, the entire contents of which are hereby incorporated by reference.

BACKGROUND OF THE INVENTION

The present invention relates to an image processing apparatus and an image processing method for storing image data and attribute data obtained by extracting a feature of the image data, and an image forming apparatus having the image processing apparatus.

In recent years, along with an increase in speed or the amount of information, as represented by the Internet, a digital multifunction product installed in an office has functions, such as a document filing process in which created documents, drawings, etc., are merged into a database and filed, in addition to processes such as facsimile, print, and copying. Thus, the digital multifunction product is shared by many users and has begun to process a large amount of image data at high speed.

Conventionally, a digital multifunction product has a fast accessible semiconductor memory as a primary storage device (image memory) and a hard disk drive (HDD) with a relatively low access speed as a secondary storage device. Image data obtained by reading a document is compressed and the compressed image data is stored on the HDD while being buffered in the primary storage device, whereby a large amount of image data is processed as fast as possible and the storage capacity of the entire storage device is reduced. Alternatively, image data obtained by reading a document is compressed and the compressed image data is stored on the HDD. Then, the compressed image data is read from the HDD where necessary, data for image formation is generated based on the read compressed image data, and the generated data for image formation is subjected to image formation (printing process) while being buffered in the primary storage device, whereby a large amount of image data is processed as fast as possible and the storage capacity of the entire storage device is reduced.

As an example of a reduction in storage capacity, Japanese Patent Application Laid-Open No. 11-239321 proposes a digital camera in which a compression process by JPEG format is performed on camera data and compressed image data is overwritten so as to avoid a camera data area that is not subjected to the compression process, whereby the storage capacity is reduced.

In a digital multifunction product, to implement reproduction of high image quality for a variety of documents, in addition to image data, a feature (e.g., concentration information or a concentration gradient of an area around an observed pixel which is obtained by a local mask) of the image data is extracted. Then, based on a result of the extraction, attribute data (e.g., characters or a photo) to be used for determination of a document type and a necessary process is generated. The image data is different from the attribute data and their compression methods are also different from each other.

Thus, when image data and attribute data are compressed and buffered in a primary storage device (image memory), different storage areas need to be provided for the image data and the attribute data, respectively. For example, FIGS. 1A and 1B each are a schematic diagram showing an exemplary memory map of a conventional image memory (primary storage device). FIG. 1A shows a memory area d1 for compressed image data and a memory area a1 for compressed attribute data which are used to buffer (store) compressed image data and compressed attribute data before the compressed image data and the compressed attribute data are stored on a secondary storage device (e.g., an HDD), the compressed image data and the compressed attribute data being obtained by compressing image data obtained by reading a document (A4, color) of a single page, for example, and attribute data generated based on the image data. The memory area d1 for compressed image data and the memory area a1 for compressed attribute data are contiguously provided.

When there are a plurality of pages of documents, memory areas for compressed image data and memory areas for compressed attribute data d2, a2, d3, a3, . . . (none of which is shown) are further contiguously provided for storing compressed image data and compressed attribute data corresponding to image data units obtained from a document of the second page, a document of the third page, . . . , respectively. The memory sizes of the memory area d1 for compressed image data and the memory area a1 for compressed attribute data are set by determining in advance the compression ratios of respective image data and attribute data. FIG. 1B shows an image memory occupancy status when compressed image data and compressed attribute data are written.

When compressed image data and compressed attribute data are decompressed and data for image formation is generated based on the decompressed image data and the decompressed attribute data and then buffered in a primary storage device (image memory), different storage areas need to be provided for the decompressed image data and the decompressed attribute data, respectively.

For example, FIG. 2 is a schematic diagram showing another exemplary memory map of a conventional image memory (primary storage device). For example, image data obtained by reading a document (A4, color) of a single page and its attribute data are compressed and the compressed image data and the compressed attribute data are stored on a secondary storage device (e.g., an HDD). When an image is formed based on the image data stored on the HDD, the image data and the attribute data stored on the HDD are stored (buffered) in an image memory. In this case, as shown in FIG. 2, a memory area that stores the compressed image data and a memory area that stores the compressed attribute data are contiguously provided.

The compressed image data and the compressed attribute data which are stored in the image memory are read, the read compressed image data and compressed attribute data are decompressed, and data for image formation (YMCK data) is generated based on image data and attribute data obtained by the decompression. The data for image formation is written in a memory area that is different from the memory areas where the compressed image data and the compressed attribute data are stored, whereby buffering of the data for image formation is performed.

BRIEF SUMMARY OF THE INVENTION

In the example of Japanese Patent Application Laid-Open No. 11-239321, however, although the memory capacity can be reduced by overwriting compressed data in an area where non-compressed data is stored, data to be processed is of only one type; thus, there is a demand for a digital multifunction product in which the memory capacity can be reduced even when different data units, such as image data and attribute data, are handled.

In the conventional example such as the one shown in FIGS. 1A and 1B, the memory area d1 for compressed image data and the memory area a1 for compressed attributed data which are reserved in advance are set to a large size so that even when the compression ratio is changed due to the characteristics of image data or the like, the memory areas do not conflict and compressed data can be certainly buffered. When image data and attribute data are actually compressed, if the compressed image data and the compressed attribute data are much smaller than the memory area d1 for compressed image data and the memory area a1 for compressed attribute data, relatively large-sized split memory areas f1 and f2 are generated (see FIG. 1B). Hence, an image memory with a large capacity needs to be prepared in advance and the use efficiency of the image memory is poor, and thus, there are demands for a reduction in the capacity of the image memory and an improvement in use efficiency.

In the conventional example such as the one shown in FIG. 2, a storage area for compressed data and a storage area for decompressed data need to be separately provided on an image memory. Thus, the capacity of the image memory cannot be reduced and a large-capacity memory is required; accordingly, there is a problem of an increase in apparatus cost.

The present invention is made in view of such circumstances and an object of the present invention is to provide an image processing apparatus and an image processing method, in which a storage area is divided into a plurality of contiguous divided areas having a predetermined data length, each divided area is divided into two areas, i.e., a first area having a first data length and a second area having a second data length, compressed image data is stored in the first areas, and compressed attribute data is stored in the second areas, whereby the capacity of an image memory can be reduced and use efficiency can be improved, and an image forming apparatus having the image processing apparatus.

Another object of the present invention is to provide an image processing apparatus and an image processing method, in which, when image data is read, compressed image data and compressed attribute data are stored in divided areas set in a storage area where the image data is stored, whereby an image memory is used in a shared manner for image data and compressed data and the capacity of the image memory can be further reduced and use efficiency can be improved, and an image forming apparatus having the image processing apparatus.

Still another object of the present invention is to provide an image processing apparatus and an image processing method, in which a storage area is divided into a plurality of contiguous divided areas having a predetermined data length, each divided area is divided into two areas, i.e., a first area having a first data length and a second area having a second data length, processed image data is stored in the first areas, and attribute data is stored in the second areas, whereby even when different data units need to be handled, the capacity of an image memory can be reduced and use efficiency can be improved, and an image forming apparatus having the image processing apparatus.

Still another object of the present invention is to provide an image processing apparatus and an image processing method, in which a storage area is divided into a plurality of contiguous divided areas having a predetermined data length, each divided area is divided into two areas, i.e., a first area having a first data length and a second area having a second data length, compressed image data is stored in the first areas, compressed attribute data is stored in the second areas, the stored compressed image data and compressed attribute data are sequentially read from the upper address side or the lower address side, data for image formation is generated based on image data and attribute data that are obtained by decompressing the read compressed image data and compressed attribute data, a plurality of contiguous divided areas where compressed image data and compressed attribute data corresponding to the generated data for image formation are stored are set on the lower address side or the upper address side of a storage area where the data for image formation is stored, and the generated data for image formation is sequentially stored from the upper address side or the lower address side of the storage area, whereby an image memory is used in a shared manner for decompressed data and compressed data and the capacity of the image memory can be reduced and use efficiency can be improved, and an image forming apparatus having the image processing apparatus.

Still another object of the present invention is to provide an image processing apparatus and an image processing method, in which a first data length or a second data length is changed, whereby regardless of the sizes of compressed image data and compressed attribute data, a split image memory is minimized and use efficiency can be improved, and an image forming apparatus having the image processing apparatus.

Still another object of the present invention is to provide an image processing apparatus and an image processing method, in which a first data length or a second data length is changed based on the compression ratio(s) of image data and/or attribute data, whereby even when the compression ratio is changed according to a variety of images, a split image memory is minimized and use efficiency can be improved, and an image forming apparatus having the image processing apparatus.

Still another object of the present invention is to provide an image processing apparatus and an image processing method, in which based on compression ratios calculated on a per image data basis and/or on a per attribute data basis, a statistical value (e.g., an average compression ratio) of the compression ratios of image data and/or attribute data is calculated and a first data length or a second data length is changed based on the calculated statistical value, whereby the use efficiency of an image memory can be improved according to user's use conditions, and an image forming apparatus having the image processing apparatus.

The present invention is directed to an image processing apparatus in which image data and attribute data obtained by extracting a feature of the image data are compressed and the compressed image data and the compressed attribute data are stored. The image processing apparatus includes means for dividing a storage area into a plurality of contiguous divided areas having a predetermined data length; and means for dividing each of the divided areas into two areas, a first area having a first data length and a second area having a second data length, wherein the compressed image data is stored in the first areas and the compressed attribute data is stored in the second areas.

A storage area (e.g., a storage area of an image memory) is divided into a plurality of contiguous divided areas having a predetermined data length, from the upper address to the lower address. Each divided area is divided into two areas, i.e., a first area having a first data length and a second area having a second data length. When compressed image data and compressed attribute data are stored starting from the upper memory address to the lower memory address, the compressed image data is sequentially stored in the first areas of the divided areas and the compressed attribute data is sequentially stored in the second areas of the divided areas. The compressed image data and the compressed attribute data each are sequentially stored starting from a divided area on the upper address side. The storage area is sequentially occupied by the compressed image data and the compressed attribute data from the upper address side to the lower address side.

By this, in the case in which, as in conventional cases, a storage area for compressed image data and a storage area for compressed attribute data are contiguously reserved from the upper address side to the lower address side of the storage areas and compressed image data and compressed attribute data are stored starting from the upper memory address to the lower memory address, when the sizes of the compressed image data and the compressed attribute data are smaller than expected, the generation of a relatively large unused split storage area in each of the storage area for compressed image data and the storage area for compressed attribute data is suppressed and an unused split storage area is made smaller than that for conventional cases.

As described above, by dividing a storage area into a plurality of contiguous divided areas having a predetermined data length, dividing each divided area into two areas, i.e., a first area having a first data length and a second area having a second data length, storing compressed image data in the first areas, and storing compressed attribute data in the second areas, the capacity of an image memory can be reduced and the use efficiency of the image memory can be improved. In addition, by reducing the size of an image memory to be installed, costs can be reduced, making is possible to further miniaturize an image processing apparatus. Furthermore, when a secondary storage device such as an HDD is used, it becomes possible to reserve a sufficient buffer area in an image memory (primary storage device). Accordingly, without being limited to a data transfer rate to the secondary storage device, the secondary storage device can be easily used in a shared manner with other functions than buffering between the secondary storage device and the image memory.

The image processing apparatus according to the present invention may include means for storing image data; setting means for contiguously setting a plurality of the divided areas in a storage area where the image data is stored; and reading means for reading the stored image data, wherein when the image data is read by the reading means, compressed image data and compressed attribute data which are obtained based on the image data may be stored in the divided areas set in the storage area where the image data is stored.

When image data is read, compressed image data and compressed attribute data which are obtained based on the image data are stored in first areas and second areas of divided areas set in a storage area where the image data is stored. By this, when the image data stored in the storage area is sequentially read starting from the upper address to the lower address, compressed image data and compressed attribute data corresponding to the read image data are overwritten in the storage area whose data has been read and which has been brought into an unused state, whereby a storage area is used in a shared manner for image data and for compressed image data and compressed attribute data.

As described above, when image data is read, by storing compressed image data and compressed attribute data in divided areas set in a storage area where the image data is stored, an image memory is used in a shred manner for image data and for compressed data, making it possible to further reduce the capacity of the image memory and improve use efficiency.

The present invention is directed to an image processing apparatus in which processed image data obtained by performing a predetermined process on image data and attribute data obtained by extracting a feature of the image data are stored. The image processing apparatus includes means for dividing a storage area into a plurality of contiguous divided areas having a predetermined data length; and means for dividing each of the divided areas into two areas, a first area having a first data length and a second area having a second data length, wherein the processed image data is stored in the first areas and the attribute data is stored in the second areas.

A storage area is divided into a plurality of contiguous divided areas having a predetermined data length, from the upper address to the lower address. Each divided area is divided into two areas, i.e., a first area having a first data length and a second area having a second data length. When processed image data and attribute data are stored starting from the upper memory address to the lower memory address, the processed image data is sequentially stored in the first areas of the divided areas and the attribute data is sequentially stored in the second areas of the divided areas. By this, the processed image data and the attribute data each are sequentially stored starting from a divided area on the upper address side and the storage area is sequentially occupied by the processed image data and the attribute data from the upper address side to the lower address side. By this, an unused split storage area is made smaller than that for conventional cases.

As described above, by dividing a storage area into a plurality of contiguous divided areas having a predetermined data length, dividing each divided area into two areas, i.e., a first area having a first data length and a second area having a second data length, storing processed image data in the first areas, and storing attribute data in the second areas, when different data units are handled, even if there is a need to reserve buffering areas for the respective different data units, the capacity of an image memory can be reduced and use efficiency can be improved.

The present invention is directed to an image processing apparatus in which image data and attribute data obtained by extracting a feature of the image data are stored. The image processing apparatus includes means for dividing a storage area into a plurality of contiguous divided areas having a predetermined data length; means for dividing each of the divided areas into two areas, a first area having a first data length and a second area having a second data length; compressing means for compressing the image data and the attribute data; means for storing the compressed image data in the first areas and stores the compressed attribute data in the second areas; reading means for sequentially reading the stored compressed image data and compressed attribute data from an upper address side or a lower address side; decompressing means for decompressing the read compressed image data and compressed attribute data; generating means for generating data for image formation based on the decompressed image data and attribute data; and setting means for setting a plurality of contiguous divided areas where compressed image data and compressed attribute data corresponding to data for image formation to be generated by the generating means are stored, on a lower address side or an upper address side of a storage area where the data for image formation is stored, wherein the data for image formation generated by the generating means is sequentially stored from the upper address side or the lower address side of the storage area.

A storage area (e.g., a storage area of an image memory) is divided into a plurality of contiguous divided areas having a predetermined data length from the upper address to the lower address. Each divided area is divided into two areas, i.e., a first area having a first data length and a second area having a second data length. Compressed image data and compressed attribute data each are sequentially stored starting from a divided area on the upper address side. The storage area is sequentially occupied by the compressed image data and the compressed attribute data from the upper address side to the lower address side. When the stored compressed image data and compressed attribute data are read, the compressed image data and the compressed attribute data are sequentially read from the upper address side or the lower address side. The read compressed image data and compressed attribute data are decompressed and data for image formation is generated based on the decompressed image data and attribute data. A plurality of contiguous divided areas where compressed image data and compressed attribute data corresponding to the generated data for image formation are stored are set on the lower address side or the upper address side of a storage area where the data for image formation is stored and the data for image formation is sequentially stored from the upper address side or the lower address side of the storage area. By this, a storage area for compressed data (a plurality of contiguous divided areas) is disposed on the lower address side or the upper address side of a storage area where data for image formation is stored, compressed image data and compressed attribute data are sequentially read from the upper address side or the lower address side to generate data for image formation, and the generated data for image formation is sequentially stored from the upper address side or the lower address side of the storage area, whereby the stored compressed image data and compressed attribute data are prevented from being overwritten by the data for image formation and a storage area is used in a shared manner for data for image formation and for compressed image data and compressed attribute data.

As described above, by dividing a storage area into a plurality of contiguous divided areas having a predetermined data length, dividing each divided area into two areas, i.e., a first area having a first data length and a second area having a second data length, storing compressed image data in the first areas, storing compressed attribute data in the second areas, sequentially reading the stored compressed image data and compressed attribute data from the upper address side or the lower address side, generating data for image formation based on image data and attribute data which are obtained by decompressing the read compressed image data and compressed attribute data, setting a plurality of contiguous divided areas where compressed image data and compressed attribute data corresponding to the generated data for image formation are stored, on the lower address side or the upper address side of a storage area where the data for image formation is stored, and sequentially storing the generated data for image formation from the upper address side or the lower address side of the storage area, an image memory is used in a shared manner for decompressed data that is decompressed for image formation, and for compressed data and the capacity of the image memory can be reduced and use efficiency can be improved. In addition, by reducing the size of an image memory to be installed, costs can be reduced, making is possible to further miniaturize an image processing apparatus. Furthermore, when a secondary storage device such as an HDD is used, it becomes possible to reserve a sufficient buffer area in an image memory (primary storage device). Accordingly, without being limited to a data transfer rate to the secondary storage device, the secondary storage device can be easily used in a shared manner with other functions than buffering between the secondary storage device and the image memory.

The image processing apparatus according to the present invention may include changing means for changing the first data length or the second data length.

The first data length or the second data length is changed by the changing means. For example, when by increasing the first data length (or by reducing the second data length) the size of compressed image data occupied in a single divided area is increased (or the size of compressed attribute data is reduced) and compressed image data and compressed attribute data are stored starting from the upper address to the lower address of a storage area, the occupancy degree of the storage area by the compressed image data is increased. When by reducing the first data length (or by increasing the second data length) the size of compressed attribute data occupied in a single divided area is increased (or the size of compressed image data is reduced) and compressed image data and compressed attribute data are stored starting from the upper address to the lower address of a storage area, the occupancy degree of the storage area by the compressed attribute data is increased.

As described above, by changing the first data length or the second data length, regardless of the sizes of compressed image data and compressed attribute data, a split image memory is minimized and use efficiency can be improved.

The image processing apparatus according to the present invention may include calculating means for calculating a compression ratio of the image data, wherein the changing means may change the first data length or the second data length based on the compression ratio calculated by the calculating means.

The compression ratio of image data (the ratio of the size of compressed image data to the size of original image data) is calculated and the first data length or the second data length is changed based on the calculated compression ratio. For example, in the case in which the compression ratio of image data is high (the compression degree is low), when the first data length is increased (or the second data length is reduced) and compressed image data and compressed attribute data are stored starting from the upper address to the lower address of a storage area, the occupancy degree of the storage area by the compressed image data is increased. In the case in which the compression ratio of image data is low (the compression degree is high), when the first data length is reduced (or the second data length is increased) and compressed image data and compressed attribute data are stored starting from the upper address to the lower address of a storage area, the occupancy degree of the storage area by the compressed image data is reduced.

The image processing apparatus according to the present invention may include calculating means for calculating, based on compression ratios calculated on a per image data basis, a statistical value of the compression ratios of image data, wherein the changing means may change the first data length or the second data length based on the statistical value calculated by the calculating means.

Based on compression ratios calculated on a per image data basis, a statistical value (e.g., an average compression ratio or a maximum compression ratio) of the compression ratios of image data is calculated and based on the calculated statistical value, the first data length or the second data length is changed. For example, when image data for a plurality of pages are processed by the first job, a compression ratio of image data for each page is calculated and an average compression ratio for the first job is calculated. When processing the second job, based on the average compression ratio obtained at the first job, the first data length or the second data length is changed. In subsequent processes, likewise, based on an average compression ratio to be calculated on a per job basis, the first data length or the second data length for a next job is changed. By this, the compression degree of image data to be used by a user is grasped for each job and the compression degree is applied to a next job.

The image processing apparatus according to the present invention may include calculating means for calculating a compression ratio of the attribute data, wherein the changing means may change the first data length or the second data length based on the compression ratio calculated by the calculating means.

The compression ratio of attribute data (the ratio of the size of compressed attribute data to the size of original attribute data) is calculated and the first data length or the second data length is changed based on the calculated compression ratio. For example, in the case in which the compression ratio of attribute data is high (the compression degree is low), when the second data length is increased (or the first data length is reduced) and compressed image data and compressed attribute data are stored starting from the upper address to the lower address of a storage area, the occupancy degree of the storage area by the compressed attribute data is increased. In the case in which the compression ratio of attribute data is low (the compression degree is high), when the second data length is reduced (or the first data length is increased) and compressed image data and compressed attribute data are stored starting from the upper address to the lower address of a storage area, the occupancy degree of the storage area by the compressed attribute data is reduced.

The image processing apparatus according to the present invention may include calculating means for calculating, based on compression ratios calculated on a per attribute data basis, a statistical value of the compression ratios of attribute data, wherein the changing means may change the first data length or the second data length based on the statistical value calculated by the calculating means.

Based on compression ratios calculated on a per attribute data basis, a statistical value (e.g., an average compression ratio or a maximum compression ratio) of the compression ratios of attribute data is calculated and based on the calculated statistical value, the first data length or the second data length is changed. For example, when attribute data for a plurality of pages are processed by the first job, a compression ratio of attribute data for each page is calculated and an average compression ratio for the first job is calculated. When processing the second job, based on the average compression ratio obtained at the first job, the first data length or the second data length is changed. In subsequent processes, likewise, based on an average compression ratio to be calculated on a per job basis, the first data length or the second data length for a next job is changed. By this, the compression degree of attribute data corresponding to image data to be used by a user is grasped for each job and the compression degree is applied to a next job.

As described above, by changing the first data length or the second data length based on the compression ratio(s) of image data and/or attribute data, even when the compression ratio is changed according to a variety of images, without depending on the compression ratio, a split image memory is minimized and use efficiency can be improved.

By calculating, based on compression ratios calculated on a per image data basis and/or on a per attribute data basis, a statistical value (e.g., an average compression ratio) of the compression ratios of image data and/or attribute data and changing the first data length or the second data length based on the calculated statistical value, for example, image data to be used by a user is determined for each job and the use efficiency of an image memory can be improved.

An image forming apparatus according to the present invention includes any of the above-described image processing apparatuses and image forming means for forming an image based on image data on which image processing is performed by the image processing apparatus.

The above and further objects and features of the invention will more fully be apparent from the following detailed description with accompanying drawings.

BRIEF DESCRIPTION OF THE SEVERAL VIEWS OF THE DRAWINGS

FIG. 6 is a table showing a relationship between the compression ratio of image data and the data size after compression;

FIG. 7 is a table showing a relationship between the compression ratio of attribute data and the data size after compression;

FIG. 8 is a table showing a relationship between contiguous data lengths and compression ratios of a memory area for compressed image data and a memory area for compressed attribute data;

FIG. 9 is a table showing a relationship between contiguous data lengths and compression ratios of a memory area for compressed image data and a memory area for compressed attribute data;

DETAILED DESCRIPTION OF THE INVENTION

The present invention will be described in detailed below based on the drawings showing embodiments thereof

First Embodiment

Figure 1B:
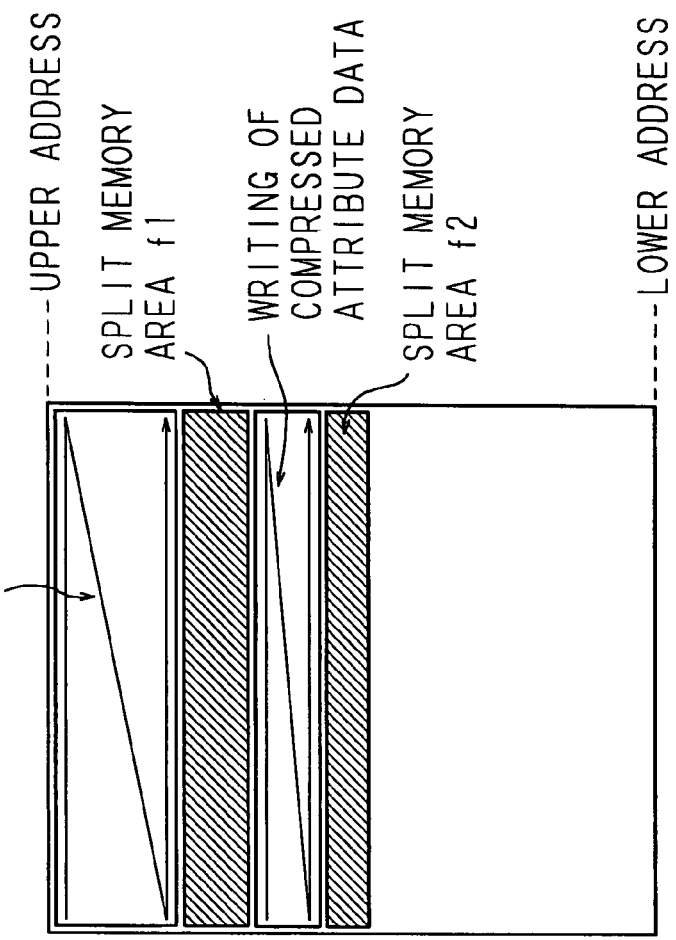
FIGS. 1A and 1B each are a schematic diagram showing an exemplary memory map of a conventional image memory (primary storage device)
Figure 1A:
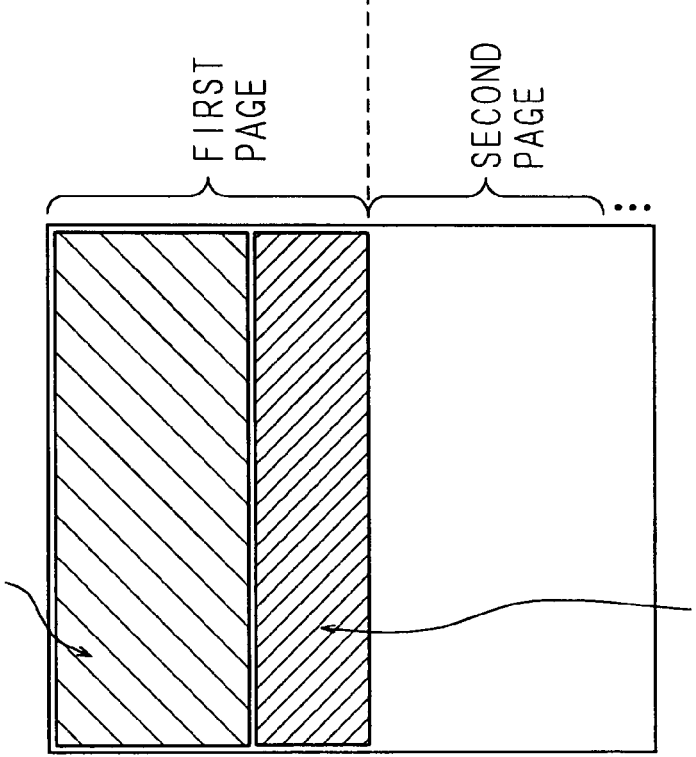
Figure 2:
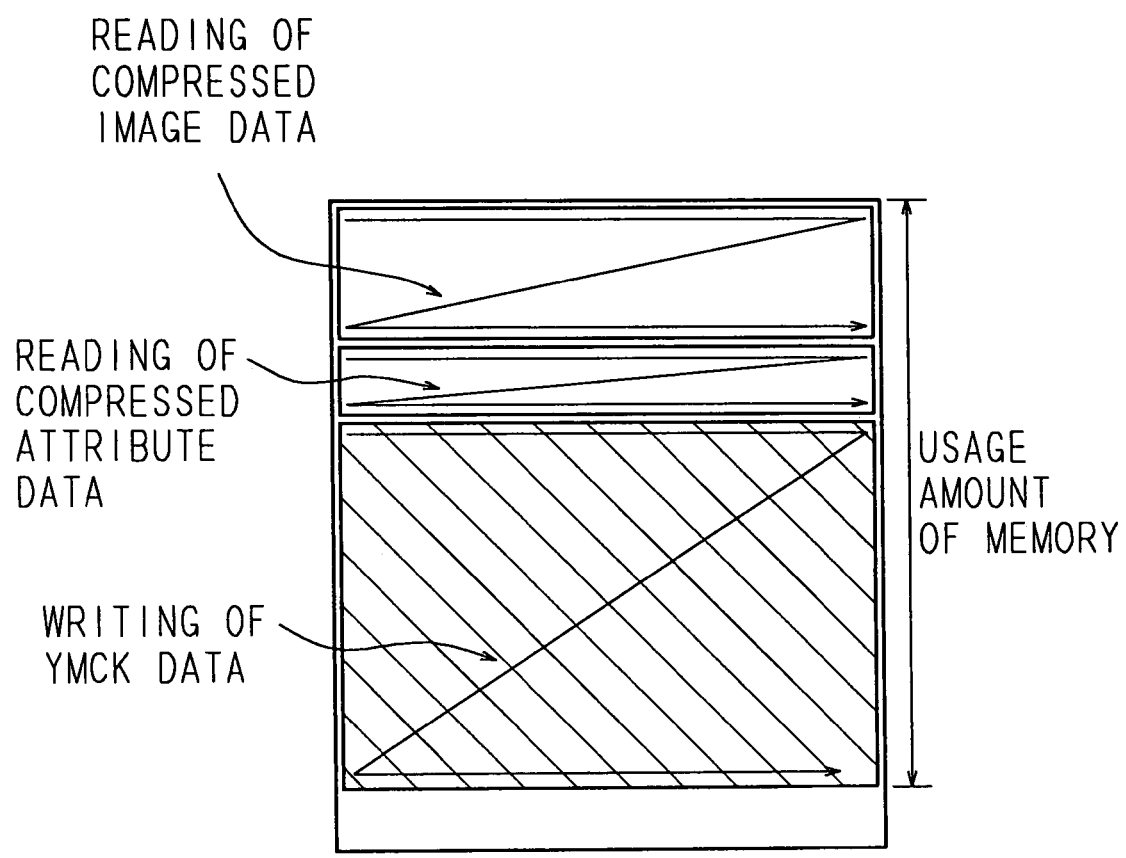
FIG. 2 is a schematic diagram showing another exemplary memory map of a conventional image memory (primary storage device)
Figure 3:
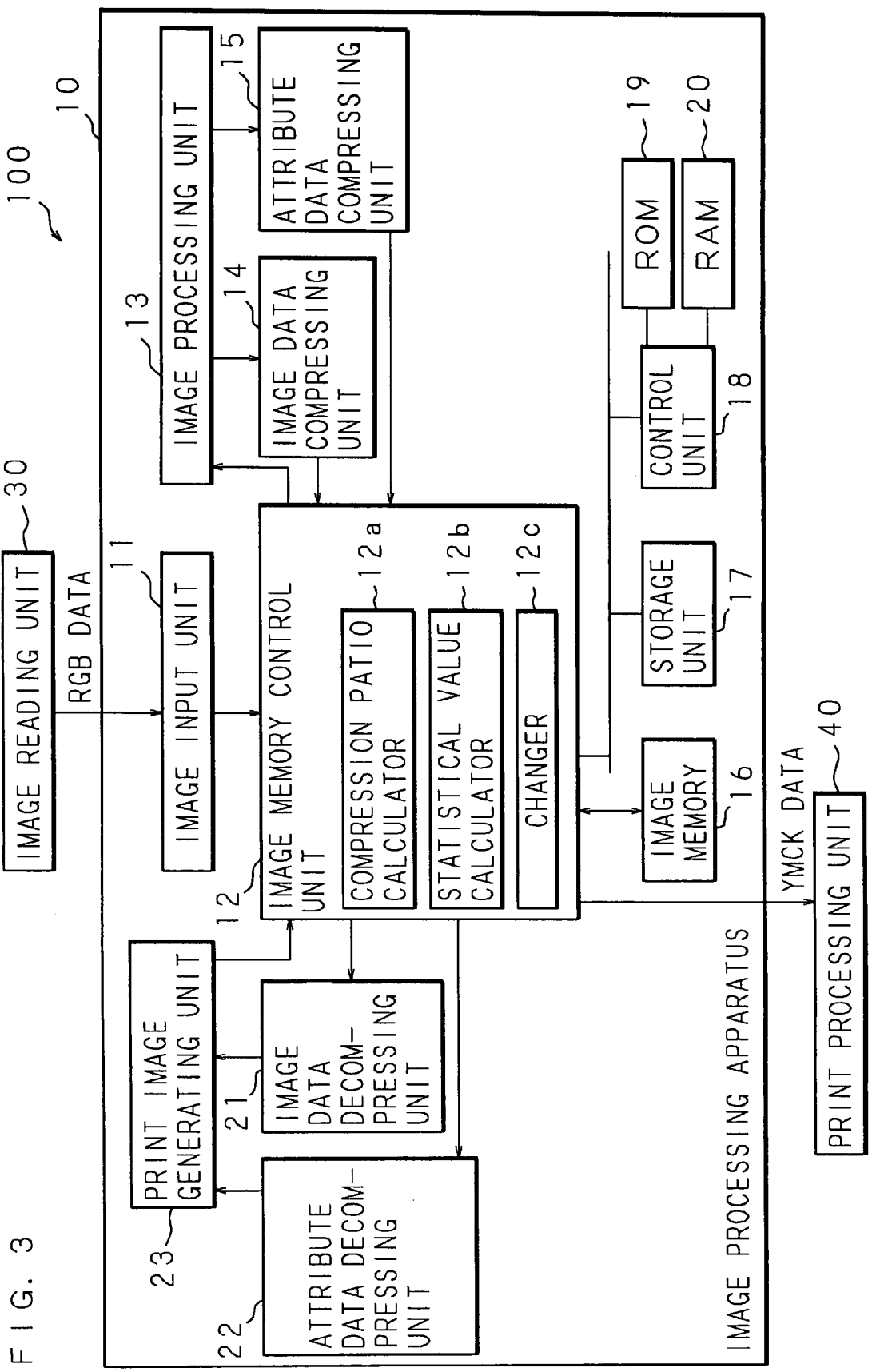
FIG. 3 is a block diagram showing an internal configuration of a digital multifunction product according to the present invention.

A digital multifunction product as an exemplary image forming apparatus having an image processing apparatus according to the present invention will be described below. FIG. 3 is a block diagram showing an internal configuration of a digital multifunction product 100 according to the present invention. As shown in FIG. 3, the digital multifunction product 100 includes an image processing apparatus 10, an image reading unit 30, a print processing unit 40, and the like. The image processing apparatus 10 includes an image input unit 11, an image memory control unit 12, an image processing unit 13, an image data compressing unit 14, an attribute data compressing unit 15, an image memory 16, a storage unit 17, a control unit 18, a ROM 19, a RAM 20, an image data decompressing unit 21, an attribute data decompressing unit 22, a print image generating unit 23, and the like.

The image reading unit 30 is an automatic document feeder (ADF), for example. The image reading unit 30 detects, by a document sensor (not shown), a document placed on a tray and transports the detected document and at the same time irradiates light onto the transported document. The mage reading unit 30 then photoelectrically converts, by a CCD (not shown), reflected light from the document into an analog signal and converts the obtained analog signal into a digital signal by an A/D converter (not shown). The image reading unit 30 outputs the digital signal (RGB data) obtained by the conversion to the image processing apparatus 10.

The image input unit 11 has an interface function for outputting the RGB data (image data) inputted from the image reading unit 30, to the image memory control unit 12.

The image memory control unit 12 includes an address specification register that specifies an address for storing (buffering) image data, compressed image data, compressed attribute data, or data for image formation (YMCK data) in the image memory 16; a signal generating unit that provides an instruction for writing or reading of data, neither of which is shown; and the like. The image memory control unit 12 divides the image data inputted from the image input unit 11, e.g., image data on a document of a single page, into a plurality of data blocks, generates a write signal for writing the image data into the image memory 16 on a per data block basis, and stores the image data in the image memory 16. When there is image data for a plurality of pages, the image data is sequentially stored in the image memory 16.

In addition, the image memory control unit 12 divides the image data on the document of a single page stored in the image memory 16 into a plurality of data blocks and generates a read signal for reading the image data from the image memory 16 on a per data block basis. The image memory control unit 12 then reads the image data from the image memory 16 and outputs the read image data to the image processing unit 13. When there is image data for a plurality of pages, the image data is sequentially read from the image memory 16 and the read image data is outputted to the image processing unit 13.

The image processing unit 13 performs editing processes, such as a correction process in which various distortions that occur in an illuminating system, an image forming system, an imaging system, and the like, of the image reading unit 30 are removed, a process of adjusting the color balance of image data, a concentration conversion process, a scaling factor conversion process, and a concentration inversion, on the inputted image data. The image processing unit 13 outputs the processed image data to the image data compressing unit 14.

In addition, the image processing unit 13 generates, based on the inputted image data, attribute data for determining whether each pixel in the image of the document is of a character area, a photo area, or an area other than those areas and separating the areas. More specifically, the image processing unit 13 generates, based on the inputted image data, attribute data on a per pixel basis (or on a per pixel block basis) by setting an M×N pixel mask (e.g., 3×3 pixels) including an observed pixel in the image, and extracting a feature such as concentration information or a concentration gradient of the observed pixel and its neighboring pixels. The image processing unit 13 then outputs the generated attribute data to the attribute data compressing unit 15.

The image data compressing unit 14 has a data compression function by a JPEG-method, for example. The image data compressing unit 14 performs data compression by lossy compression on the image data inputted from the image processing unit 13. The image data compressing unit 14 sequentially outputs the compressed image data to the image memory control unit 12 on a per predetermined data size data block basis. Note that the compression method is not limited to the JPEG method and any other method can be used.

The attribute data compressing unit 15 has a data compression function by an LHA-method or the like, for example. The attribute data compressing unit 15 performs data compression by lossless compression on the attribute data inputted from the image processing unit 13. The attribute data compressing unit 15 sequentially outputs the compressed attribute data to the image memory control unit 12 on a per predetermined data size data block basis. Note that the compression method is not limited to the LHA-method or the like and any other method can be used.

The image memory control unit 12 divides the compressed image data and the compressed attribute data which are inputted from the image data compressing unit 14 and the attribute data compressing unit 15, respectively, into a plurality of data blocks. The image memory control unit 12 then generates a write signal for writing the compressed image data and the compressed attribute data into the image memory 16 on a per data block basis and stores the compressed image data and the compressed attribute data in the image memory 16. By this, the image memory control unit 12 buffers the compressed image data and the compressed attribute data in the image memory 16 before storing the compressed image data and the compressed attribute data in the storage unit 17 (e.g., a secondary storage device composed of an HDD).

The image memory control unit 12 includes a compression ratio calculator 12a that calculates a compression ratio of each of the image data and the attribute data based on a data size before a compression process and a data size after a compression process. In addition, the image memory control unit 12 includes a statistical value calculator 12b that stores the compression ratios computed for each of the image data and the attribute data and calculates, based on the plurality of compression ratios, a statistical value (an average compression ratio, a maximum compression ratio, or the like) of the compression ratios. In addition, the image memory control unit 12 includes a changer 12c that changes, based on the calculated compression ratios or statistical value, a numerical value to be set in the address specification register and changes a continuous data length Ld of a memory area D1 for compressed image data and a continuous data length La of a memory area A1 for compressed attribute data, as will be described later (see FIGS. 4A and 12).

Figure 4:
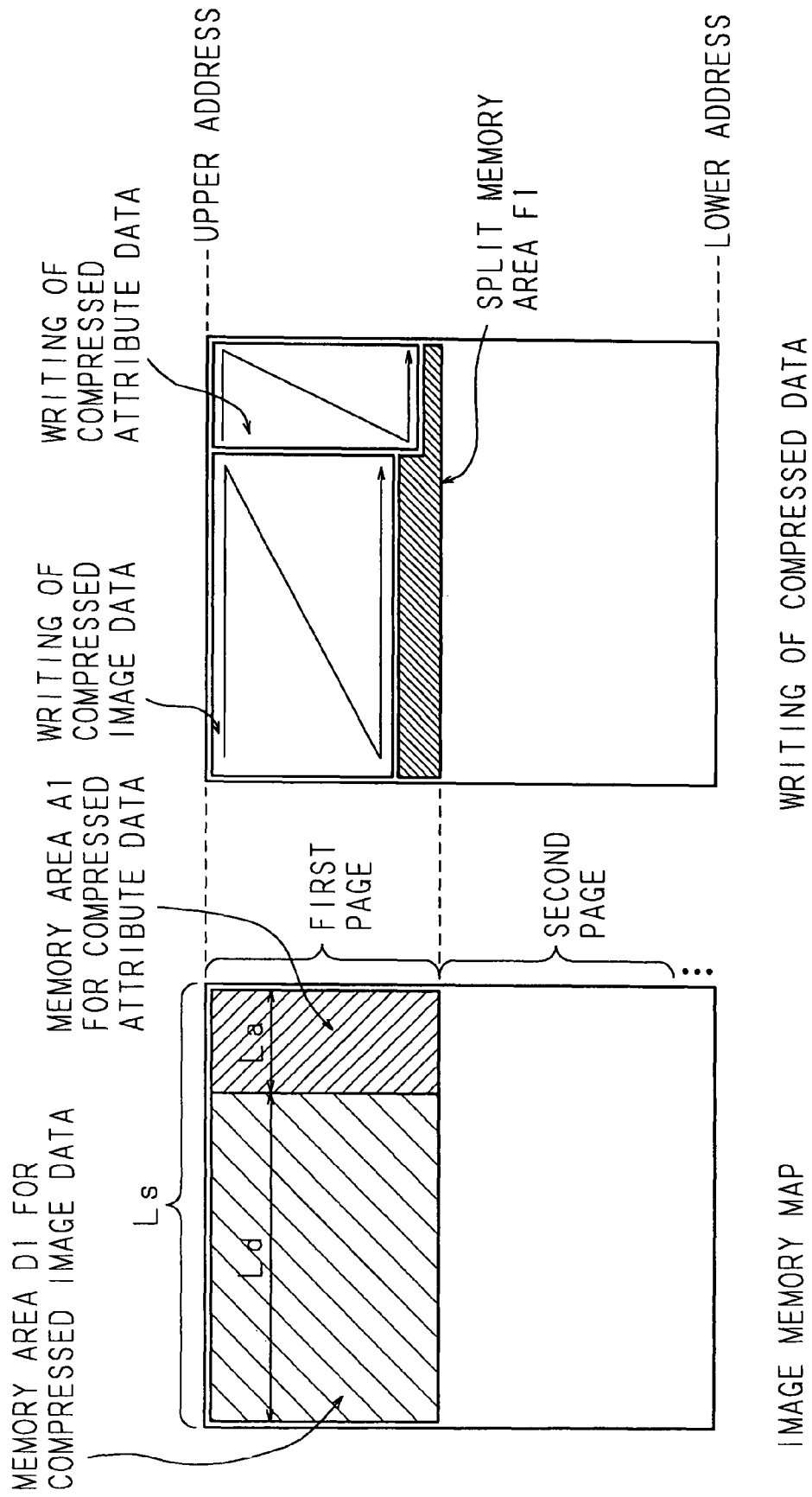
FIGS. 4A and 4B each are a schematic diagram showing an exemplary memory map (first embodiment) of an image memory for compressed image data and compressed attribute data.

FIGS. 4A and 4B each are a schematic diagram showing an exemplary memory map of the image memory 16 for compressed image data and compressed attribute data. As shown in FIG. 4A, storage areas where compressed data is stored are contiguously provided on a per page basis, starting from the upper address to the lower address. A storage area for a single page is divided into a plurality of divided areas having a data length of Ls. Each divided area is divided into two areas, i.e., a first area having a data length of Ld and a second area having a data length of La (Ls=Ld+La). A plurality of first areas are gathered starting from the upper address to the lower address, whereby a memory area D1 for compressed image data is composed. A plurality of second areas are gathered starting from the upper address to the lower address, whereby a memory area A1 for compressed attribute data is composed. The configuration of the second page is the same as that of the first page. Note that the configuration may be such that the upper address in the drawing is on the lower side and the lower address is on the upper side.

As shown in FIG. 4B, when the image memory control unit 12 writes compressed image data and compressed attribute data into the image memory 16, the image memory control unit 12 sequentially writes the compressed image data, starting from the upper address to the lower address of the memory area D1 for compressed image data, and sequentially writes the compressed attribute data, starting from the upper address to the lower address of the memory area A1 for compressed attribute data. By this, the compressed image data and the compressed attribute data each are sequentially stored from the upper address side of the image memory 16 and the storage area is sequentially occupied by the compressed image data and the compressed attribute data from the upper address side to the lower address side. Thus, it is possible to suppress the generation of a relatively large unused split storage area and minimize an unused split storage area (memory area F1).

The image memory control unit 12 generates a read signal for reading the compressed image data and the compressed attribute data which are stored (buffered) in the image memory 16. The image memory control unit 12 then reads the compressed image data and the compressed attribute data from the image memory 16 such that the compressed image data and the compressed attribute data each are divided into a plurality of data blocks, and stores the read compressed image data and compressed attribute data in the storage unit 17.

When an image is formed (printed) on a recording sheet based on the compressed image data and the compressed attribute data which are stored in the storage unit 17, the image memory control unit 12 reads the compressed image data and the compressed attribute data from the storage unit 17 and outputs the read compressed image data and compressed attribute data to the image data decompressing unit 21 and the attribute data decompressing unit 22, respectively.

The image data decompressing unit 21 performs a decompression process on the compressed image data inputted from the image memory control unit 12 and outputs the processed image data to the print image generating unit 23. The attribute data decompressing unit 22 performs a decompression process on the compressed attribute data inputted from the image memory control unit 12 and outputs the processed attribute data to the print image generating unit 23.

The control unit 18 is composed of a microcomputer, for example, and controls the overall processing of the image processing apparatus 10. Specifically, the control unit 18 loads a control program which is stored in the ROM 19 and provides control steps of the control unit 18, into the RAM 20 and thereby controls the operation of the image processing apparatus 10 according to the control steps provided by the control program. For example, by the control unit 18 performing job management, the control unit 18 can instruct the image memory control unit 12 to calculate an average compression ratio of compression ratios of a plurality of image data units that are processed by a single job, and instruct to set a data length Ld of the memory area D1 for compressed image data and a data length La of the memory area A1 for compressed attribute data which are used when image data to be processed by a next job is compressed using the calculated average compression ratio and the compressed image data is stored in the image memory 16.

The print image generating unit 23 converts RGB data into YMCK data based on the inputted image data and the attribute data corresponding to the image data. The print image generating unit 23 then outputs the converted image data (YMCK data) to the print processing unit 40 through the image memory control unit 12. More specifically, the print image generating unit 23 converts the RGB data to a CMYK color space and performs, for example, a color correction process, a tone correction process, or binarization or a predetermined tone image generation process according to the characteristics of the print processing unit 40, based on the attribute data.

The print processing unit 40 forms an image on a sheet based on the image data inputted from the image processing apparatus 10 and discharges the sheet having the image formed thereon. The print processing unit 40 includes, for example, a photosensitive drum, a charger that charges the photosensitive drum to a predetermined potential, a laser writing device that forms an electrostatic latent image on a surface of the photosensitive drum, a development device that supplies toner to the electrostatic latent image on the surface of the photosensitive drum for visualization, and a transfer device that transfers the toner image on the surface of the photosensitive drum onto a sheet (none of which is shown). Note that the print processing unit 40 is not limited to that of an electrophotographic method and any other method such as an ink-jet method or a thermal transfer method may be used.

Figure 5:
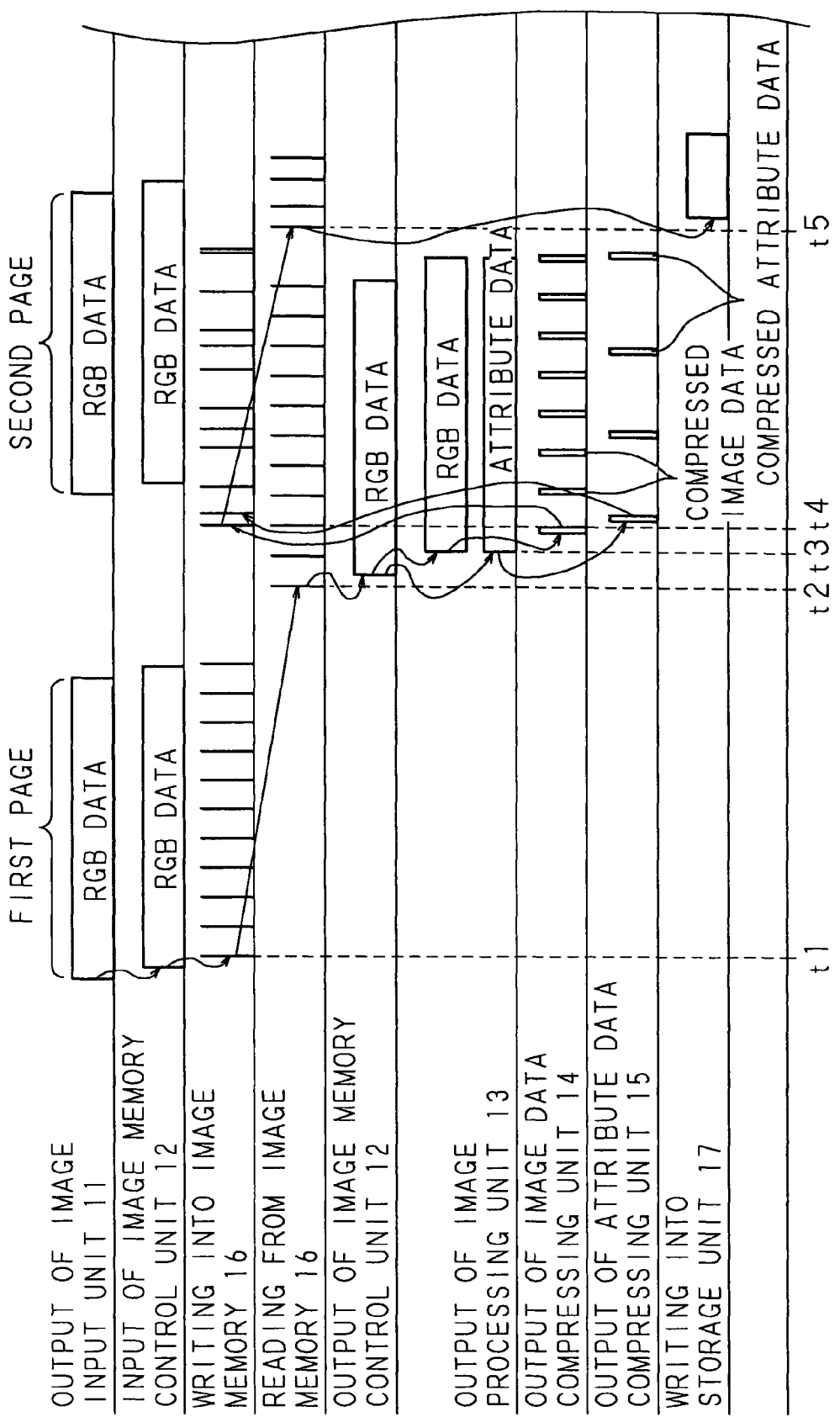
FIG. 5 is a time chart showing steps of an image data storage process.

Now, the operation of the image processing apparatus 10 will be described. FIG. 5 is a time chart showing the steps of an image data storage process. The image input unit 11 outputs to the image memory control unit 12 RGB data (image data) read from a document of a single page, for example. The image memory control unit 12 generates a write signal from time t1 using the inputted RGB data as a trigger and performs a process of writing the RGB data into the image memory 16 on a per predetermined data block basis.

The image memory control unit 12 generates a read signal for reading the RGB data stored in the image memory 16, at time t2 where a predetermined period of time (the time necessary to write the RGB data) has elapsed from the point in time when the generation of the write signal is started at time t1. The image memory control unit 12 then performs a process of reading the RGB data from the image memory 16 on a per predetermined data block basis.

The image memory control unit 12 outputs to the image processing unit 13 the RGB data read from the image memory 16. At time t3, the image processing unit 13 outputs the RGB data and attribute data generated based on the RGB data to the image data compressing unit 14 and the attribute data compressing unit 15, respectively.

The image data compressing unit 14 and the attribute data compressing unit 15 respectively output compressed image data and compressed attribute data which are obtained through a compression process, to the image memory control unit 12 on a per predetermined data block basis. The image memory control unit 12 generates, at time t4, a write signal for storing (buffering) the compressed image data and the compressed attribute data in the image memory 16. The image memory control unit 12 then performs a process of writing the compressed image data and the compressed attribute data into the image memory 16 on a per predetermined data block basis.

At time t5 where a predetermined period of time (the time necessary to write the compressed image data and the compressed attribute data) has elapsed from the point in time when the generation of the write signal is started at time t4, the image memory control unit 12 generates a read signal for reading the compressed image data and the compressed attribute data which are stored in the image memory 16. The image memory control unit 12 then performs a process of writing the compressed image data and the compressed attribute data into the storage unit 17 on a per predetermined data block basis. By this, the compressed image data and the compressed attribute data are retained in the storage unit 17. The same process is also performed on image data read from documents of the second and subsequent pages.

FIG. 6 is a table showing the relationship between the compression ratio of image data and the data size after compression. In this case, the size of original image data before compression is about 100 megabytes. For example, when the compression ratio is 10%, the original image data (about 100 megabytes) is compressed to 9.96 megabytes.

FIG. 7 is a table showing the relationship between the compression ratio of attribute data and the data size after compression. In this case, the size of original attribute data before compression is about 33 megabytes. For example, when the compression ratio is 10%, the original attribute data (about 33 megabytes) is compressed to 3.32 megabytes.

FIG. 8 is a table showing the relationship between contiguous data lengths Ld and La and compression ratios of the memory area D1 for compressed image data and the memory area A1 for compressed attribute data. In FIG. 8, the size of original image data before compression is about 100 megabytes and the size of original attribute data before compression is about 33 megabytes. The total length of the contiguous data length Ld for image data and the contiguous data length La for attribute data is Ls, and in this case, Ls is 21048 bytes. This indicates that when, for example, a document of about A4 in size and with RGB each 8 bits (24 bits in total) is read at 600 dpi, the size of image data is 7016 pixels×4961 lines and 7016 pixels×24 bits=21048 bytes per line and thus 21048 bytes can be set as the data length per line.

The contiguous data length Ld for image data can be set, for example, as follows. Specifically, $Ld=Ls\times(Ds\times RD)/(Ds\times RD+As\times RA)$. Here, Ls is the data length per line. (the data length of a divided area), Ds is the size of image data before compression, RD is the compression ratio of the image data, As is the size of attribute data before compression, and RA is the compression ratio of the attribute data.

As shown in FIG. 8, the compression ratio of image data is 10% and as the compression ratio of attribute data decreases from 20%, for example, the contiguous data length Ld of the memory area D1 for compressed image data is increased while the contiguous data length La of the memory area A1 for compressed attribute data is reduced. By this, when compressed image data and compressed attribute data are stored starting from the upper address to the lower address of the storage area, the occupancy degree of the storage area by the compressed image data is increased and the occupancy degree of the storage area by the compressed attribute data is reduced. By this, when compressed image data and compressed attribute data are stored in the image memory 16, the difference between the number of divided areas occupied by the image data and the number of divided areas occupied by the attribute data is reduced, making it possible to minimize an unused split memory.

FIG. 9 is a table showing the relationship between contiguous data lengths Ld and La and compression ratios of the memory area D1 for compressed image data and the memory area A1 for compressed attribute data. In an example shown in FIG. 9, the compression ratio of attribute data is 20% and as the compression ratio of image data decreases from 20%, for example, the contiguous data length Ld of the memory area D1 for compressed image data is reduced while the contiguous data length La of the memory area A1 for compressed attribute data is increased. By this, when compressed image data and compressed attribute data are stored starting from the upper address to the lower address of the storage area, the occupancy degree of the storage area by the compressed attribute data is increased and the occupancy degree of the storage area by the compressed image data is reduced. By this, when compressed image data and compressed attribute data are stored in the image memory 16, the difference between the number of divided areas occupied by the image data and the number of divided areas occupied by the attribute data is reduced, making it possible to minimize an unused split memory.

Figure 10B:
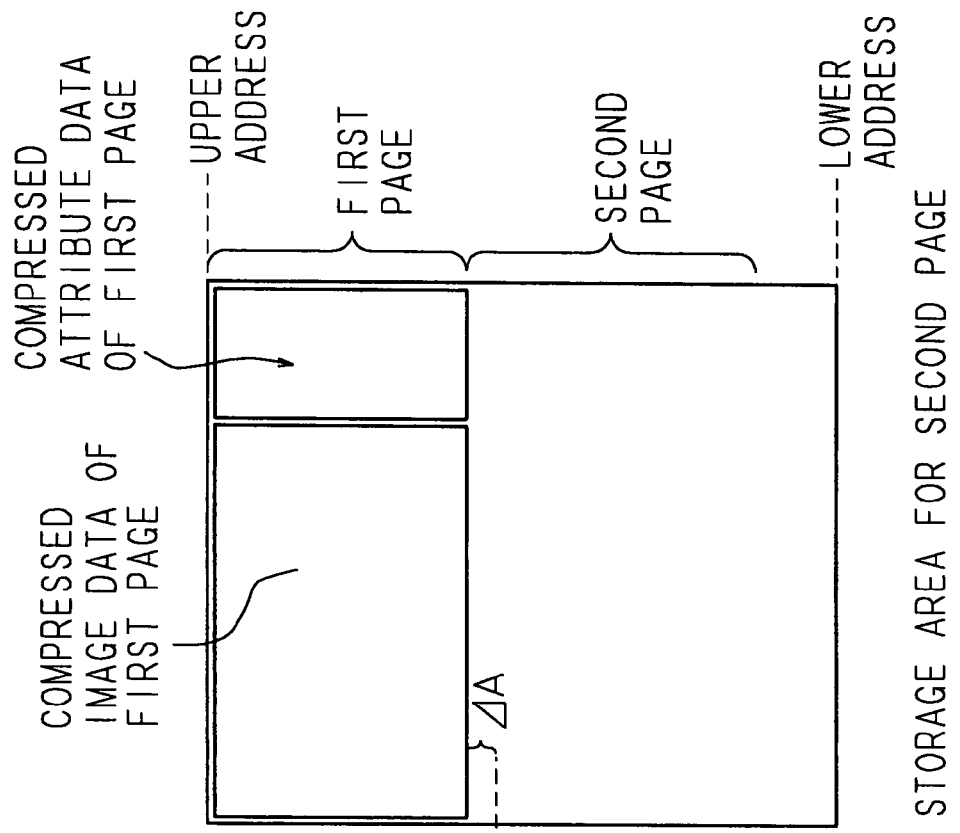
FIGS. 10A and 10B each are a schematic diagram showing an exemplary memory map of an image memory for the case in which the difference between the numbers of divided areas is reduced.
Figure 10A:
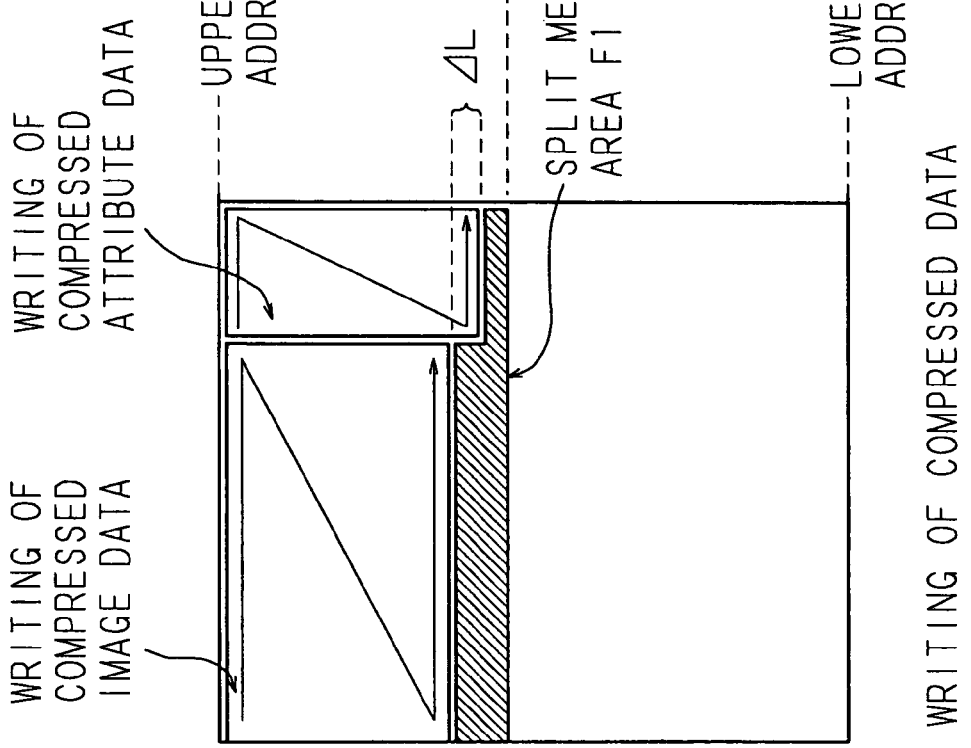

FIGS. 10A and 10B each are a schematic diagram showing an exemplary memory map of the image memory 16 for the case in which the difference between the numbers of divided areas is reduced. As described in FIGS. 8 and 9, when compressed image data and compressed attribute data are stored starting from the upper address to the lower address of the storage area, by adjusting the occupancy degree of the storage area by the compressed image data or the occupancy degree of the storage area by the compressed attribute data, as shown in FIG. 10A, a difference $\Delta L$ between the number of divided areas occupied by the compressed image data and the number of divided areas occupied by the compressed attribute data can be reduced.

As shown in FIG. 10B, when the difference $\Delta L$ between the numbers of divided areas is small (e.g., $\Delta L \approx 0$), lower address sides of respective storage areas where compressed image data and compressed attribute data for the first page are stored are substantially aligned, and thus, maximum contiguous storage areas can be reserved. By this, start addresses of respective storage areas where compressed image data and compressed attribute data for the second page are stored can be set to the highest memory address (e.g., the start addresses can be set toward the upper address side by an amount equivalent to $\Delta A$), making it possible to make the most of the storage areas.

Figure 11:
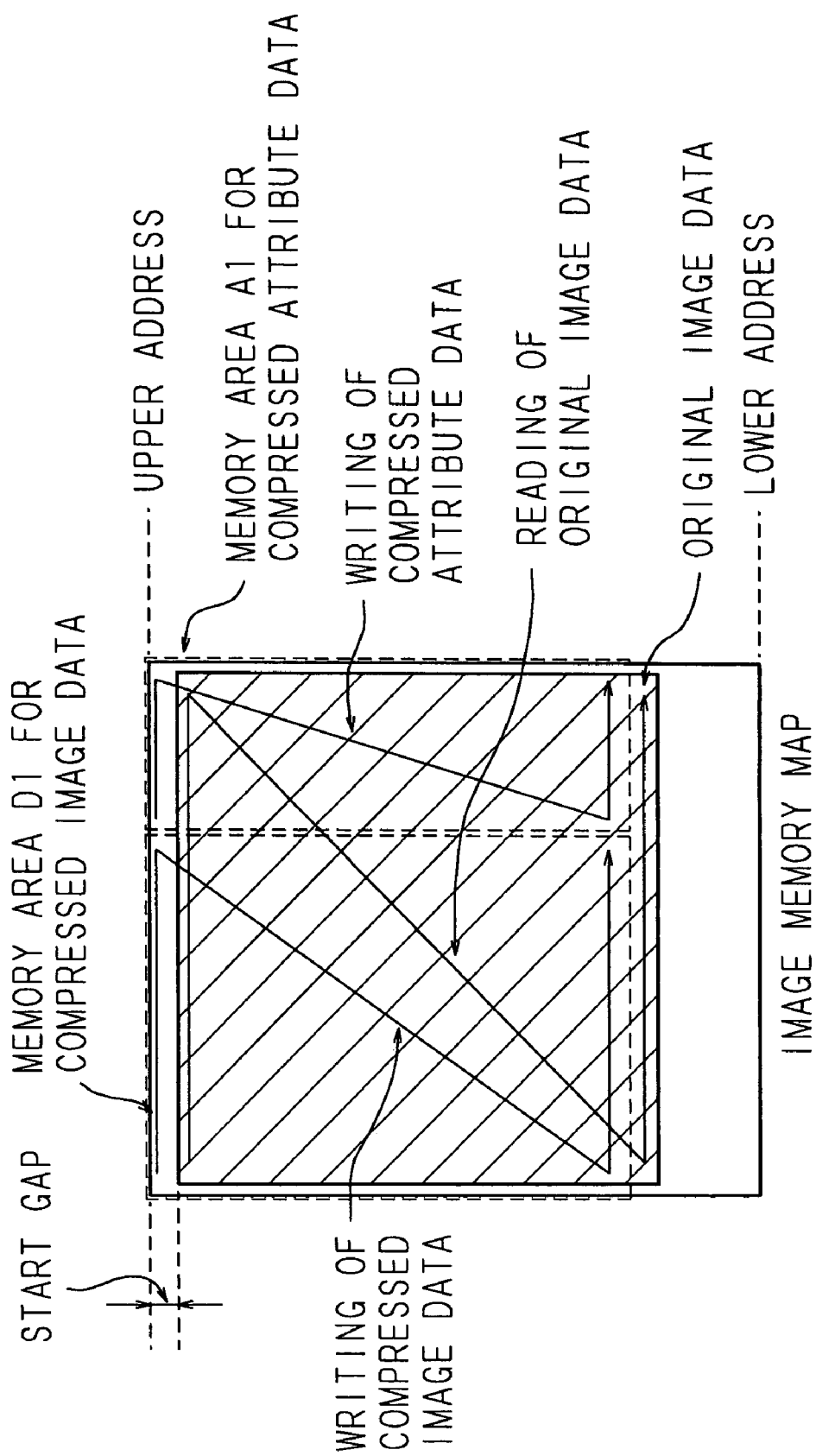
FIG. 11 is a schematic diagram showing an exemplary memory map for the case in which compressed image data and compressed attribute data are written (overwritten) into a storage area where image data is stored.

FIG. 11 is a schematic diagram showing an exemplary memory map for the case in which compressed image data and compressed attribute data are written (overwritten) into a storage area where image data is stored. As shown in FIG. 11, when the image memory control unit 12 reads image data (original image data) from the image memory 16, the image memory control unit 12 reads the image data line by line or lines by lines from the upper address side. When the read image data and attribute data generated based on the image data are compressed and the compressed image data and the compressed attribute data are written into the image memory 16, the image memory control unit 12 writes the compressed image data and the compressed attribute data in a storage area from which the image data (original image data) has been read and where a memory area D1 for compressed image data and a memory area A1 for compressed attribute data are set. By this, a storage area can be used in a shared manner for image data (original image data) and for compressed image data and compressed attribute data, making it possible to reduce the storage capacity of the image memory 16. Note that in FIG. 11 a start gap is appropriately set so as to prevent original image data stored in the image memory 16 from being overwritten before the original image data is read.

Although the first embodiment describes storing (buffering) of image data and attribute data that have been subjected to a compression process, in the image memory 16, the present invention is not limited thereto; even when a compression process is not performed, the present invention can be applied. Specifically, the present invention can also be applied to the case of storing (buffering) in the image memory 16 different data units, i.e., processed image data having been subjected to image processing and attribute data, instead of compressed image data and compressed attribute data. By this, when different data units are handled, even if there is a need to reserve buffering areas for the respective different data units, the capacity of an image memory can be reduced and use efficiency can be improved.

Second Embodiment

Now, a second embodiment will be described in which, in addition to compressed image data and compressed attribute data, data for image formation (YMCK data) generated based on image data and attribute data is also stored (buffered) in the image memory 16. Note that the configuration of the digital multifunction product 100 that implements the second embodiment is the same as that described in the first embodiment.

Figure 12:
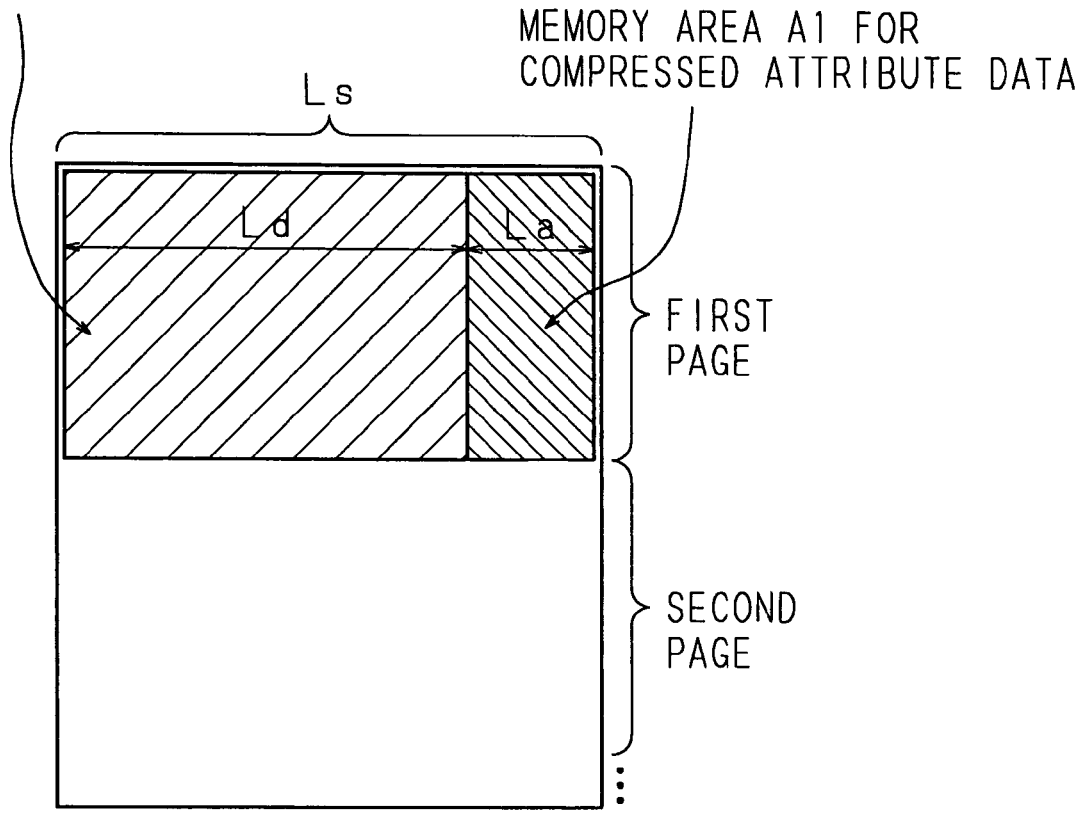
FIG. 12 is a schematic diagram showing another exemplary memory map (second embodiment) of the image memory for compressed image data and compressed attribute data.

FIG. 12 is a schematic diagram showing an exemplary memory map of the image memory 16 for compressed image data and compressed attribute data. As shown in FIG. 12, storage areas where compressed data is stored are contiguously provided on a per page basis, starting from the upper address to the lower address. A storage area for a single page is divided into a plurality of divided areas having a data length of Ls. Each divided area is divided into two areas, i.e., a first area having a data length of Ld and a second area having a data length of La (Ls=Ld+La). A plurality of first areas are gathered starting from the upper address to the lower address, whereby a memory area D1 for compressed image data is composed. A plurality of second areas are gathered starting from the upper address to the lower address, whereby a memory area A1 for compressed attribute data is composed. The configuration of the second page is the same as that of the first page.

When the image memory control unit 12 writes compressed image data and compressed attribute data into the image memory 16, the image memory control unit 12 sequentially writes the compressed image data, starting from the upper address to the lower address of the memory area D1 for compressed image data, and sequentially writes the compressed attribute data, starting from the upper address to the lower address of the memory area A1 for compressed attribute data. By this, the compressed image data and the compressed attribute data each are sequentially stored from the upper address side of the image memory 16 and the storage areas are sequentially occupied by the compressed image data and the compressed attribute data from the upper address side to the lower address side. Thus, it is possible to prevent the generation of an unused split storage area.

The image memory control unit 12 generates a read signal for reading the compressed image data and the compressed attribute data which are stored (buffered) in the image memory 16. The image memory control unit 12 then reads the compressed image data and the compressed attribute data from the image memory 16 such that the compressed image data and the compressed attribute data each are divided into a plurality of data blocks, and stores the read compressed image data and compressed attribute data in the storage unit 17.

When the image memory control unit 12 forms (prints) an image on a recording sheet based on the compressed image data and the compressed attribute data which are stored in the storage unit 17, the image memory control unit 12 reads the compressed image data and the compressed attribute data from the storage unit 17, generates a write signal for writing the read compressed image data and compressed attribute data into the image memory 16, and stores (buffers) the compressed image data and the compressed attribute data in the image memory 16. In this case too, the image memory control unit 12 sequentially writes the compressed image data, starting from the upper address to the lower address of the memory area D1 for compressed image data, and sequentially writes the compressed attribute data, starting from the upper address to the lower address of the memory area A1 for compressed attribute data.

The image memory control unit 12 generates a read signal for reading from the image memory 16 the compressed image data and the compressed attribute data which are stored in the image memory 16 and reads the compressed image data and the compressed attribute data from the image memory 16. The image memory control unit 12 then outputs the read compressed image data and compressed attribute data to the image data decompressing unit 21 and the attribute data decompressing unit 22, respectively. In this case, the image memory control unit 12 sequentially reads the compressed image data, starting from the upper address to the lower address of the memory area D1 for compressed image data, and sequentially reads the compressed attribute data, starting from the upper address to the lower address of the memory area A1 for compressed attribute data. The reading of the compressed image data and the reading of the compressed attribute data are concurrently performed.

The print image generating unit 23 converts RGB data into YMCK data based on image data inputted from the image data decompressing unit 21 and attribute data corresponding to the image data and inputted from the attribute data decompressing unit 22. The print image generating unit 23 then outputs the converted YMCK data (data for image formation) to the image memory control unit 12. More specifically, the print image generating unit 23 converts the RGB data to a CMYK color space and performs, for example, a color correction process, a tone correction process, or binarization or a predetermined tone image generation process according to the characteristics of the print processing unit 40, based on the attribute data.

The image memory control unit 12 generates a write signal for writing the YMCK data inputted from the print image generating unit 23 into the image memory 16 and stores the YMCK data in the image memory 16. In this case, the image memory control unit 12 sequentially writes the YMCK data, starting from the upper address to the lower address of a storage area for storing the YMCK data. By this, the YMCK data is stored (buffered) in the image memory 16.

Figure 13:
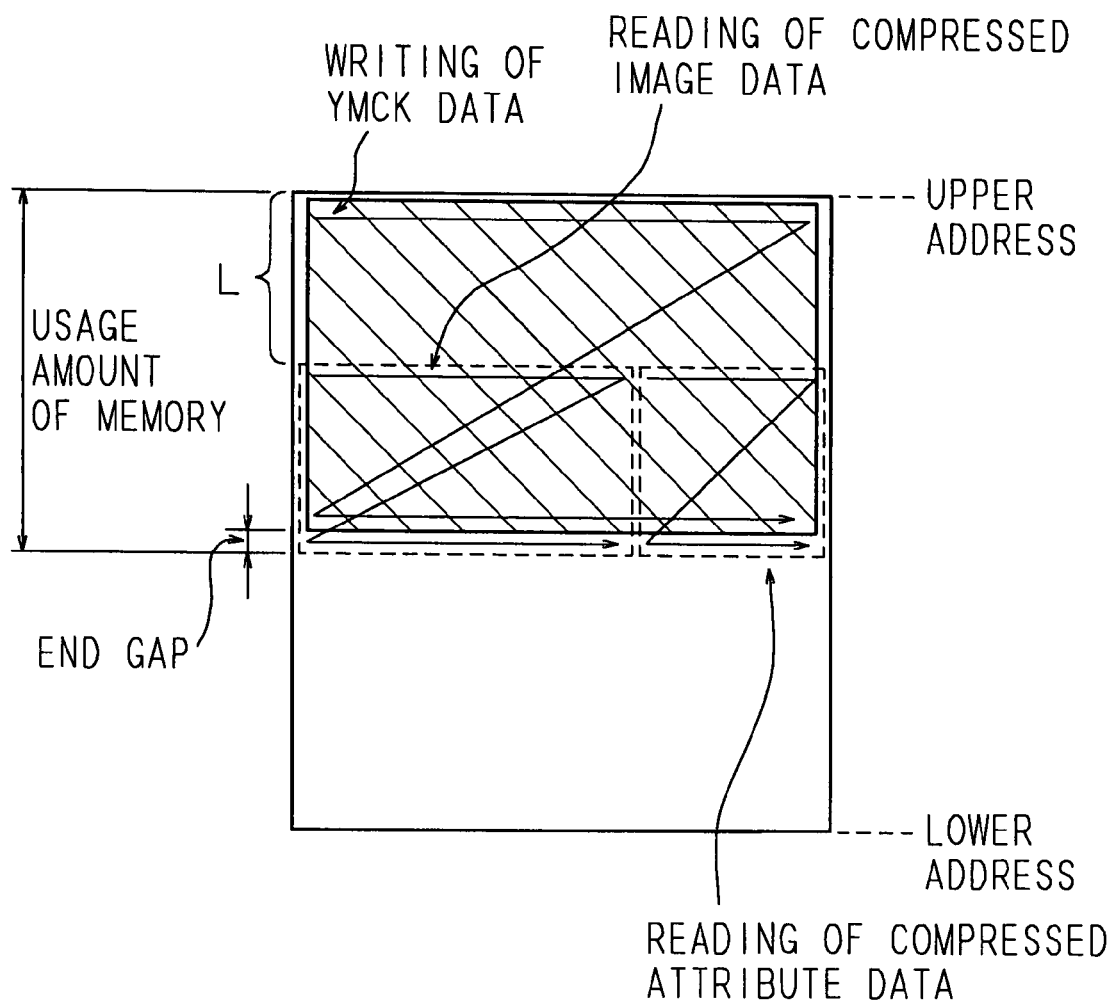
FIG. 13 is a schematic diagram showing an exemplary memory map for the case in which YMCK data is written (overwritten) into storage areas where compressed image data and compressed attribute data are stored.

FIG. 13 is a schematic diagram showing an exemplary memory map for the case in which YMCK data is written (overwritten) into storage areas where compressed image data and compressed attribute data are stored. As shown in FIG. 13, on the lower address side of a storage area where YMCK data is stored, a plurality of contiguous divided areas where compressed image data and compressed attribute data corresponding to the YMCK data are stored are disposed. Specifically, a starting address of the storage area where the YMCK data is stored is separated from a starting address of the storage area (divided areas) where the compressed image data is stored, by a predetermined data length L. Note that in FIG. 13 an end gap is appropriately set so as to prevent compressed image data and compressed attribute data which are stored in the image memory 16 from being overwritten by YMCK data before the compressed image data and the compressed attribute data are read.

As shown in FIG. 13, when the image memory control unit 12 reads compressed image data and compressed attribute data from the image memory 16, the image memory control unit 12 concurrently reads the compressed image data and the compressed attribute data line by line or lines by lines from the upper address side. On the other hand, when the image memory control unit 12 writes into the image memory 16 YMCK data generated based on the read compressed image data and compressed attribute data, the image memory control unit 12 writes the YMCK data, starting from the upper address to the lower address of the storage area. In this case, the above described data length L can be set such that before the last one line (or the last plurality of lines) of each of the compressed image data and the compressed attribute data which are stored in the divided areas is(are) read, such data is not overwritten by YMCK data generated based on compressed image data and compressed attribute data that have been read previous to the last one line (or the last plurality of lines).

By this, a storage area can be used in a shared manner for YMCK data and for compressed image data and compressed attribute data, making it possible to reduce the storage capacity of the image memory 16.

The image memory control unit 12 outputs the YMCK data stored (buffered) in the image memory 16 to the print processing unit 40.

Figure 14:
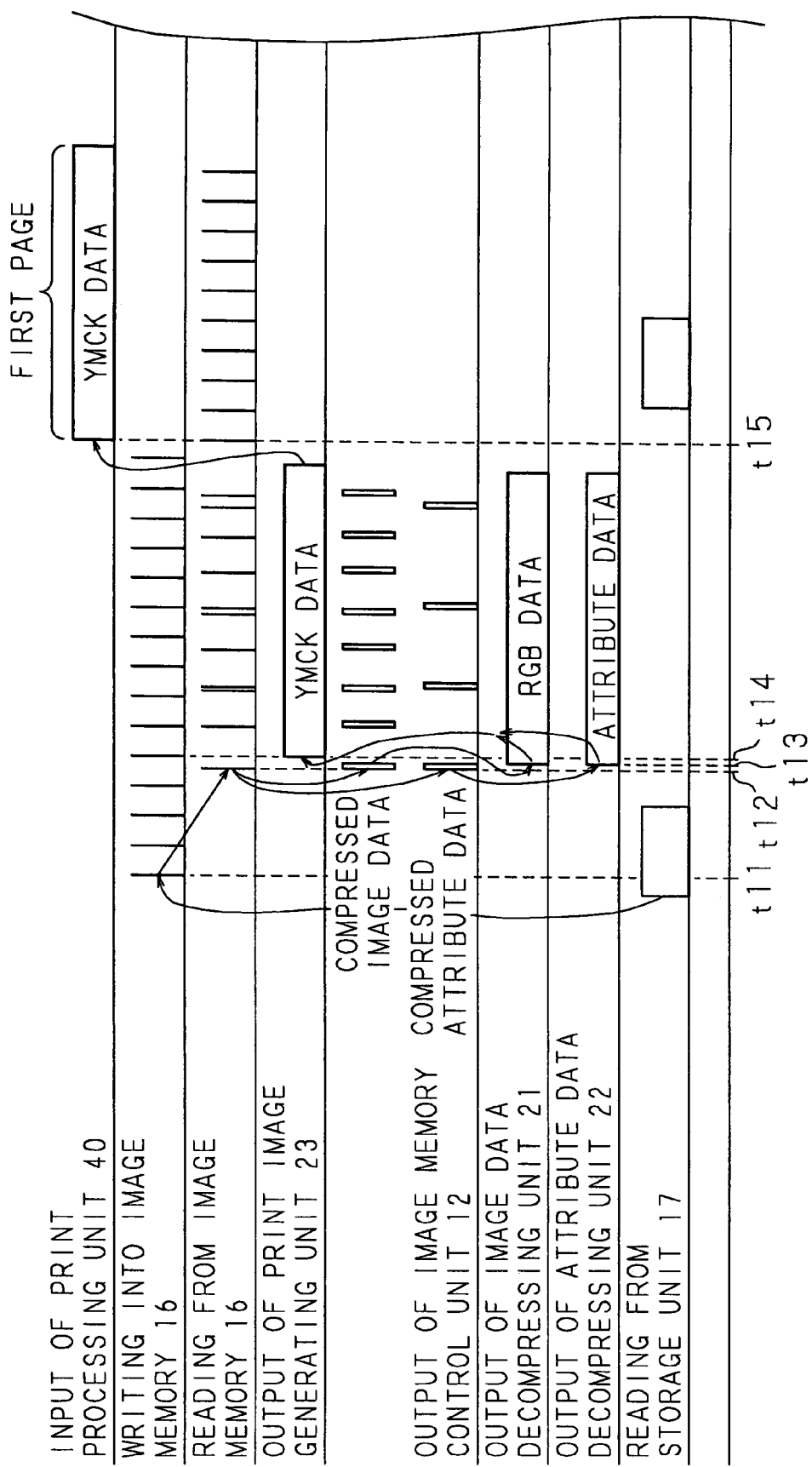
FIG. 14 is a time chart showing steps of YMCK data storage process.

Now, the operation of the image processing apparatus 10 will be described. FIG. 14 is a time chart showing the steps of YMCK data storage process. The image memory control unit 12 reads compressed image data and compressed attribute data which are stored in the storage unit 17. Then, at time t11, the image memory control unit 12 generates a write signal and writes (buffers) the read compressed image data and compressed attribute data into the image memory 16.

At time t12 where a predetermined period of time (the time necessary for writing) has elapsed from the point in time when the generation of the write signal is started at time t11, or later, the image memory control unit 12 generates a read signal for reading the compressed image data and the compressed attribute data which are stored in the image memory 16 and performs a process of reading the compressed image data and the compressed attribute data from the image memory 16.

The image memory control unit 12 outputs the compressed image data and the compressed attribute data that have been read from the image memory 16, to the image data decompressing unit 21 and the attribute data decompressing unit 22, respectively. The image data decompressing unit 21 and the attribute data decompressing unit 22 respectively output, at time t13 or later, decompressed RGB data and decompressed attribute data to the print image generating unit 23.

The print image generating unit 23 generates YMCK data based on the inputted RGB data and attribute data and outputs the generated YMCK data to the image memory control unit 12.

The image memory control unit 12 generates, at time t14, a write signal for storing (buffering) in the image memory 16 the YMCK data inputted from the print image generating unit 23, and writes the YMCK data into the image memory 16.

At time t15 where a predetermined period of time (e.g., the time necessary to write the YMCK data or the time set according to data transfer time to the HDD, or the like) has elapsed from the point in time when the generation of the write signal is started at time t14, the image memory control unit 12 reads the YMCK data stored in the image memory 16 and outputs the read YMCK data to the print processing unit 40. By this, image formation of a document of a single page is performed. When there are a plurality of pages of documents for image formation, the same process is performed.

The relationship between the compression ratio of image data and the data size after compression is the same as that described in the first embodiment (FIG. 6). The relationship between the compression ratio of attribute data and the data size after compression is also the same as that described in the first embodiment (FIG. 7). Furthermore, the relationship between the contiguous data lengths Ld and La and compression ratios of the memory area D1 for compressed image data and the memory area A1 for compressed attribute data is also the same as that described in the first embodiment (FIGS. 8 and 9). Thus, as with the first embodiment, the contiguous data length Ld for image data can be set such that Ld=Ls×(Ds×RD)/(Ds×RD+As'3 RA).

In the second embodiment too, as with the first embodiment, when compressed image data and compressed attribute data are stored in the image memory 16, the difference between the number of divided areas occupied by the image data and the number of divided areas occupied by the attribute data is reduced, making it possible to minimize an unused split memory. In addition, in the second embodiment, when stored compressed image data and compressed attribute data are concurrently read from the image memory 16, a storage area is sequentially brought into an unused state from the upper address side to the lower address side; thus, without the storage area being split, a usable area can be made larger than that of conventional cases.

Figure 15:
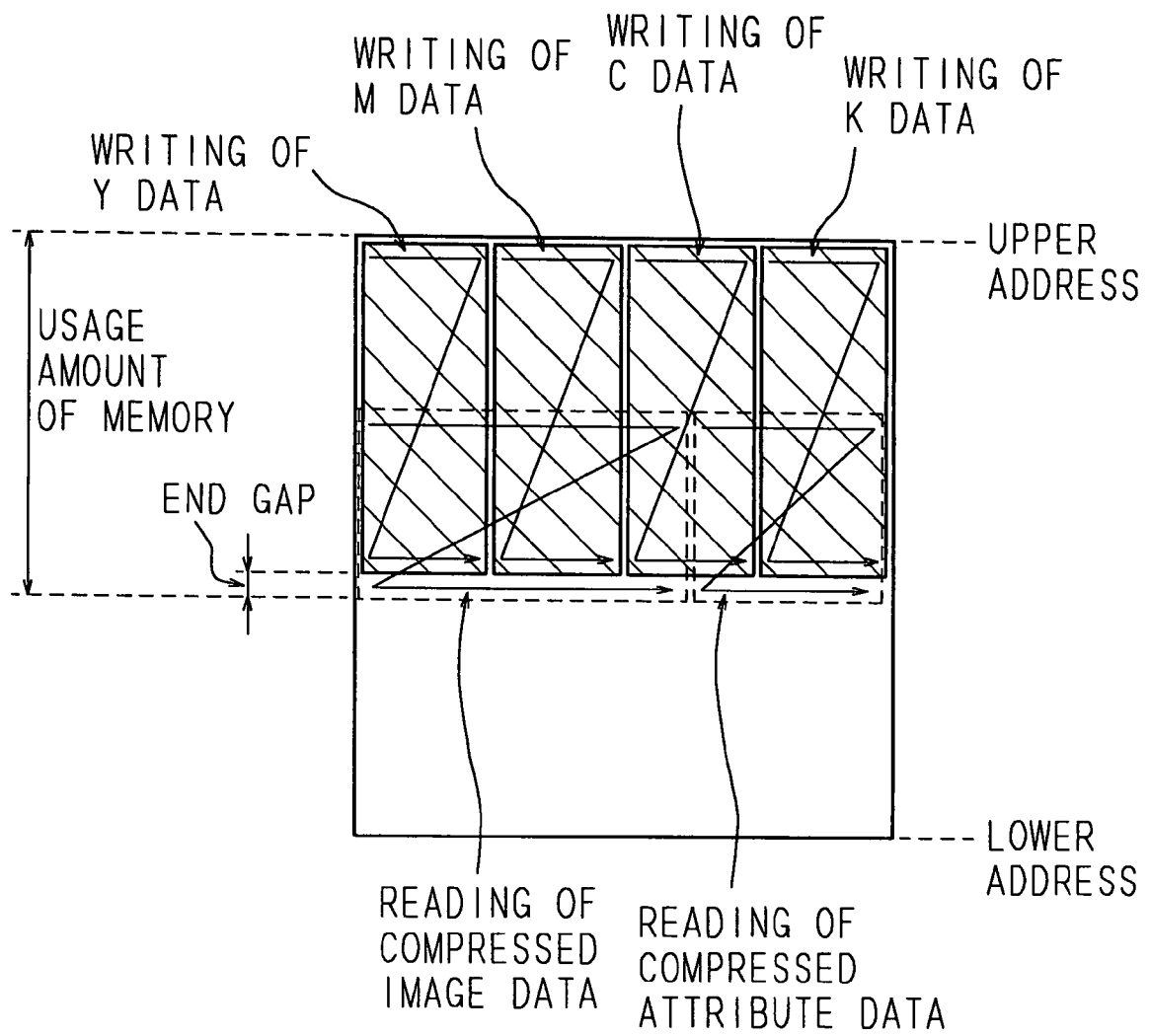
FIG. 15 is a schematic diagram showing an exemplary memory map for the case in which YMCK data is divided and written (overwritten) into storage areas where compressed image data and compressed attribute data are stored.

Note that in the above-described example, when YMCK data is written into the image memory 16, the YMCK data can be divided into Y data, M data, K data, and C data and written. FIG. 15 is a schematic diagram showing an exemplary memory map for the case in which YMCK data is divided and written (overwritten) into storage areas where compressed image data and compressed attribute data are stored.

As shown in FIG. 15, a storage area of a single line where YMCK data is stored can be divided into four areas and Y data, M data, C data, and K data can be separately stored in the areas, respectively. In this case too, on the lower address side of the storage areas where the YMCK data is stored, a plurality of contiguous divided areas where compressed image data and compressed attribute data corresponding to the YMCK data are stored are disposed.

Although the second embodiment describes storing (buffering) of image data and attribute data that have been subjected to a compression process and YMCK data (data for image formation), in the image memory 16, the present invention is not limited thereto; even when a compression process is not performed, the present invention can be applied. Specifically, the present invention can also be applied to the case of storing (buffering) in the image memory 16 different data units, such as image data and attribute data, and YMCK data instead of compressed image data and compressed attribute data. By this, when different data units are handled, even if there is a need to reserve buffering areas for the respective different data units, the capacity of an image memory can be reduced and use efficiency can be improved.

Although in the second embodiment the configuration is such that divided areas where compressed image data and compressed attribute data are stored are set (disposed) within a storage area(s) where YMCK data is stored and on the lower address side of the storage area(s), the present invention is not limited thereto; for example, the configuration may be such that the upper address side of divided areas where compressed image data and compressed attribute data are stored and the lower address side of a storage area(s) where YMCK data is stored are a common side.

As described above, in the present invention, the capacity of an image memory can be reduced and the use capacity of the image memory can be improved. In addition, by reducing the size of an image memory to be installed, costs can be reduced, making is possible to further miniaturize an image processing apparatus. Furthermore, when a secondary storage device such as an HDD is used, it becomes possible to reserve a sufficient buffer area in an image memory (primary storage device). Accordingly, without being limited to a data transfer rate to the secondary storage device, the secondary storage device can be easily used in a shared manner with other functions than buffering between the secondary storage device and the image memory. By using an image memory in a shared manner for image data and compressed data or by using an image memory in a shared manner for YMCK data and compressed data, the capacity of the image memory can be further reduced and use efficiency can be further improved.

Although in the embodiments the configuration is such that the contiguous data length Ld of a memory area D1 for compressed image data and the contiguous data length La of a memory area A1 for compressed attribute data are changed according to the compression ratio of image data and the compression ratio of attribute data, the present invention is not limited thereto; the data lengths Ld and La may be changed based on one of the compression ratio of image data and the compression ratio of attribute data.

In the embodiments, when the contiguous data length Ld of a memory area D1 for compressed image data and the contiguous data length La of a memory area A1 for compressed attribute data are changed according to the compression ratio of image data and the compression ratio of attribute data, a table in which compression ratios are associated with contiguous data lengths may be stored in the storage unit 17 or calculation may be performed using an arithmetic circuit or the like.

In the embodiments, the values of data lengths Ls, Ld, and La are merely examples and the present invention is not limited thereto.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
   a compressing unit that compresses image data and attribute data obtained by extracting a feature of the image data;
   a storage unit that stores the compressed image data and the compressed attribute data which are compressed by the compressing unit; and
   a control unit that performs:
   a process (i) of dividing a storage area of the storage unit into a plurality of contiguous divided areas having a predetermined data length;
   a process (ii) of dividing each of the divided areas into two areas, a first area having a first data length and a second area having a second data length; and
   a process (iii) of storing the compressed image data in the first areas and storing the compressed attribute data in the second areas.

2. The image processing apparatus according to claim 1, wherein
   the storage unit stores image data, and
   the control unit performs:
   a process (iv) of contiguously setting a plurality of the divided areas in a storage area of the storage unit where the image data is stored; and
   a process (v) of storing, when the image data is read, compressed image data and compressed attribute data which are obtained based on the image data, in the divided areas set in the storage area where the image data is stored.

3. The image processing apparatus according to claim 1, further comprising a changing unit that changes the first data length or the second data length.

4. The image processing apparatus according to claim 3, further comprising a calculating unit that calculates a compression ratio of the image data, wherein
   the changing unit changes the first data length or the second data length based on the calculated compression ratio of the image data.

5. The image processing apparatus according to claim 4, further comprising a calculating unit that calculates, based on compression ratios calculated on a per image data basis, a statistical value of the compression ratios of image data, wherein
   the changing unit changes the first data length or the second data length based on the calculated statistical value of the compression ratios of the image data.

6. The image processing apparatus according to claim 3, further comprising a calculating unit that calculates a compression ratio of the attribute data, wherein
   the changing unit changes the first data length or the second data length based on the calculated compression ratio of the attribute data.

7. The image processing apparatus according to claim 6, further comprising a calculating unit that calculates, based on compression ratios calculated on a per attribute data basis, a statistical value of the compression ratios of attribute data, wherein
   the changing unit changes the first data length or the second data length based on the calculated statistical value of the compression ratios of the attribute data.

8. An image forming apparatus comprising:
   the image processing apparatus of claim 1; and
   an image forming unit that forms an image based on image data on which image processing is performed by the image processing apparatus.

9. An image processing apparatus comprising:
   a storage unit that stores image data and attribute data obtained by extracting a feature of the image data;
   a compressing unit that compresses the image data and the attribute data;

a decompressing unit that decompresses the compressed image data and the compressed attribute data;

a generating unit that generates data for image formation based on the decompressed image data and attribute data; and a control unit that performs:

a process (i) of dividing a storage area of the storage unit into a plurality of contiguous divided areas having a predetermined data length;

a process (ii) of dividing each of the divided areas into two areas, a first area having a first data length and a second area having a second data length;

a process (iii) of storing the compressed image data compressed by the compressing unit in the first areas and storing the compressed attribute data compressed by the compressing unit in the second areas;

a process (iv) of sequentially reading the stored compressed image data and compressed attribute data from an upper address side or a lower address side;

a process (v) of setting a plurality of contiguous divided areas where compressed image data and compressed attribute data corresponding to data for image formation are stored, on a lower address side or an upper address side of a storage area where the data for image formation is stored, the data for image formation being generated by the generating unit based on image data and attribute data that are obtained by decompressing the read compressed image data and compressed attribute data; and a process (vi) of sequentially storing the data for image formation generated by the generating unit, from the upper address side or the lower address side of the storage area.

10. The image processing apparatus according to claim 9, further comprising a changing unit that changes the first data length or the second data length.

11. The image processing apparatus according to claim 10, further comprising a calculating unit that calculates a compression ratio of the image data, wherein
the changing unit changes the first data length or the second data length based on the calculated compression ratio of the image data.

12. The image processing apparatus according to claim 11, further comprising a calculating unit that calculates, based on compression ratios calculated on a per image data basis, a statistical value of the compression ratios of image data, wherein
the changing unit changes the first data length or the second data length based on the calculated statistical value of the compression ratios of the image data.

13. The image processing apparatus according to claim 10, further comprising a calculating unit that calculates a compression ratio of the attribute data, wherein
the changing unit changes the first data length or the second data length based on the calculated compression ratio of the attribute data.

14. The image processing apparatus according to claim 13, further comprising a calculating unit that calculates, based on compression ratios calculated on a per attribute data basis, a statistical value of the compression ratios of attribute data, wherein
the changing unit changes the first data length or the second data length based on the calculated statistical value of the compression ratios of the attribute data.

15. An image forming apparatus comprising:

the image processing apparatus of claim 9; and an image forming unit that forms an image based on image data on which image processing is performed by the image processing apparatus.

16. An image processing method in which image data and attribute data obtained by extracting a feature of the image data are stored, the method comprising the steps of:

dividing a storage area into a plurality of contiguous divided areas having a predetermined data length;

dividing each of the divided areas into two areas, a first area having a first data length and a second area having a second data length;

compressing the image data and the attribute data;

storing the compressed image data in the first areas and storing the compressed attribute data in the second areas;

sequentially reading the stored compressed image data and compressed attribute data from an upper address side or a lower address side;

decompressing the read compressed image data and compressed attribute data;

generating data for image formation based on the decompressed image data and attribute data;

setting a plurality of contiguous divided areas where compressed image data and compressed attribute data corresponding to data for image formation to be generated are stored, on a lower address side or an upper address side of a storage area where the data for image formation is stored; and sequentially storing the generated data for image formation from the upper address side or the lower address side of the storage area.

* * * * *